US011896953B2

(12) United States Patent
Betz et al.

(10) Patent No.: US 11,896,953 B2
(45) Date of Patent: Feb. 13, 2024

(54) HLB COPOLYMERS

(71) Applicant: Sigma-Aldrich Co. LLC, St. Louis, MO (US)

(72) Inventors: William Betz, State College, PA (US); Curtis Frantz, State College, PA (US); Michael Keeler, Bellefonte, PA (US); Michael Ye, Bellefonte, PA (US); Ken Espenschied, Spring Mills, PA (US); Sara Smith, St. Louis, MO (US); Brittany A. Smith, State College, PA (US)

(73) Assignee: Sigma-Aldrich Co. LLC, St. Louis, MO (US)

( * ) Notice: Subject to any disclaimer, the term of this patent is extended or adjusted under 35 U.S.C. 154(b) by 787 days.

(21) Appl. No.: 16/640,575

(22) PCT Filed: Aug. 24, 2018

(86) PCT No.: PCT/US2018/047950
§ 371 (c)(1),
(2) Date: Feb. 20, 2020

(87) PCT Pub. No.: WO2019/040868
PCT Pub. Date: Feb. 28, 2019

(65) Prior Publication Data
US 2020/0197907 A1 Jun. 25, 2020

Related U.S. Application Data

(60) Provisional application No. 62/549,771, filed on Aug. 24, 2017.

(51) Int. Cl.
| | | |
|---|---|---|
| *B01J 20/28* | (2006.01) | |
| *B01J 20/26* | (2006.01) | |
| *B01J 20/30* | (2006.01) | |
| *B01J 20/32* | (2006.01) | |
| *C08F 212/36* | (2006.01) | |
| *C08F 220/44* | (2006.01) | |

(52) U.S. Cl.
CPC ....... *B01J 20/264* (2013.01); *B01J 20/28004* (2013.01); *B01J 20/28019* (2013.01); *B01J 20/28061* (2013.01); *B01J 20/28064* (2013.01); *B01J 20/28083* (2013.01); *B01J 20/3042* (2013.01); *B01J 20/3085* (2013.01); *B01J 20/3092* (2013.01); *B01J 20/3204* (2013.01); *B01J 20/3276* (2013.01); *C08F 212/36* (2013.01); *C08F 220/44* (2013.01); *B01J 2220/54* (2013.01); *B01J 2220/62* (2013.01)

(58) Field of Classification Search
CPC .................. B01J 20/28; B01J 20/28004; B01J 20/28019; B01J 20/28061; B01J 20/28064; B01J 20/28083; B01J 20/3042; B01J 20/3085; B01J 20/3092; B01J 20/3204; B01J 20/3276; B01J 2220/54; B01J 2220/62; C08F 212/36; C08F 220/44
USPC ........................................................ 502/402
See application file for complete search history.

(56) References Cited

U.S. PATENT DOCUMENTS

| | | | |
|---|---|---|---|
| 4,045,353 A | 8/1977 | Kosaka et al. | |
| 4,839,331 A | 6/1989 | Maroldo et al. | |
| 4,957,897 A | 9/1990 | Maroldo et al. | |
| 5,021,391 A | 6/1991 | Agui et al. | |
| 5,094,754 A | 3/1992 | Maroldo et al. | |
| 5,104,530 A | 4/1992 | Maroldo et al. | |
| 5,599,445 A | 2/1997 | Betz et al. | |
| 5,607,580 A | 3/1997 | Betz et al. | |
| 5,609,756 A | 3/1997 | Betz et al. | |
| 5,620,603 A | 4/1997 | Betz et al. | |
| 5,630,937 A | 5/1997 | Betz et al. | |
| 5,653,875 A | 8/1997 | Betz et al. | |
| 7,815,864 B2 | 10/2010 | Betz et al. | |
| 7,875,738 B2 | 1/2011 | Betz et al. | |
| 8,088,350 B2 | 1/2012 | Betz et al. | |
| 8,092,770 B2 | 1/2012 | Betz et al. | |
| 2004/0000522 A1 | 1/2004 | Xie et al. | |
| 2015/0231602 A1 | 8/2015 | Pawliszyn | |

FOREIGN PATENT DOCUMENTS

| | | |
|---|---|---|
| EP | 0576198 A1 | 12/1993 |
| EP | 1531168 A1 | 5/2005 |
| EP | 2664366 A2 | 11/2013 |
| JP | 2005-146249 A | 6/2005 |
| JP | 2005-531011 A | 10/2005 |
| WO | 97/38774 A2 | 10/1997 |
| WO | 02/101362 A1 | 12/2002 |

(Continued)

OTHER PUBLICATIONS

Office Action received for Japanese Patent Application No. 2020-511153 dated Jul. 5, 2022, 6 pages (1 Page of English translation & 5 Pages of Official Copy).

Bloor et al., "Polymer/Surfactant Interactions. The Use of Isothermal Titration Calorimetry and emf Measurements in the Sodium Dodecyl Sulfate/ Poly(N-vinylpyrrolidone) System", Langmuir, vol. 11, No. 6, 1995, pp. 2312-2313.

Folmer et al., "Effect of Surfactant-Polymer Association on the Stabilities of Foams and Thin Films: Sodium Dodecyl Sulfate and Poly(vinyl pyrrolidone)", Langmuir, vol. 16, No. 14, 2000, pp. 5987-5992.

(Continued)

*Primary Examiner* — Edward M Johnson
(74) *Attorney, Agent, or Firm* — Sigma-Aldrich Co. LLC

(57) ABSTRACT

Polymeric adsorbents useful for solid phase extraction (SPE) comprising a copolymer formed by copolymerizing at least one hydrophobic monomer including divinylbenzene and at least one hydrophilic monomer including acrylonitrile are provided. Also provided are SPE cartridges including a divinylbenzene-acrylonitrile hydrophilic-lipophilic balance adsorbent. Further provided are methods of using a divinylbenzene-acrylonitrile hydrophilic-lipophilic balance adsorbent in conventional and simplified SPE techniques.

49 Claims, 14 Drawing Sheets

(56) References Cited

FOREIGN PATENT DOCUMENTS

WO         03/102061   A1    12/2003
WO     2019/040868   A1     2/2019

OTHER PUBLICATIONS

Hait et al., "A Critical Assessment of Micellization of Sodium Dodecyl Benzene Sulfonate (SDBS) and its Interaction with Poly(vinyl pyrrolidone) and Hydrophobically Modified Polymers, JR 400 and LM 200", The Journal of Physical Chemistry B, vol. 107, No. 15, 2003, pp. 3650-3658.

Office Action received for Chinese Patent Application No. 201880069725.2 dated Jul. 20, 2022, 30 Pages (17 Pages of English Translation & 13 Pages of Official Copy).

International Search Report and Written Opinion received for PCT Patent Application No. PCT/US2018/047950, dated Nov. 19, 2018, 14 pages.

Ozgen, et al., "Synthesis and Characterization of Acrylonitrile-co-Divinylbenzene (AN/DVB) Polymeric Resins for the Isolation of Aroma Compounds and Anthocyanins from Strawberry", Food and Bioprocess Technology, Sep. 27, 2012, pp. 2884-2894.

Trochimczuk, et al., "Highly Polar Polymeric Sorbents Characterization and Sorptive Properties towards Phenol and its Derivatives", Reactive & Functional Polymers, vol. 46, 2001, pp. 259-271.

Communication Pursuant to Article 94(3) EPC received for European Patent Application No. 18765334.0 dated Nov. 2, 2022, 5 Pages.

HLB COPOLYMERS

CROSS-REFERENCE TO RELATED APPLICATIONS

This application is a US National Stage application of International Application No. PCT/US2018/047950, filed Aug. 24, 2018, which claims the benefit of priority of U.S. Provisional Patent Application No. 62/549,771 filed Aug. 24, 2017, the entirety of each of which is incorporated herein by reference.

BACKGROUND

An omnipresent desire within analytical chemistry is the development of a "universal" approach to sample preparation that is useful for a wide variety of matrices, from environmental and agrochemical samples, to biological samples, to pharmaceutical samples, to foods and beverages. These samples typically include both analytes of interest as well as unwanted or interfering analytes. Solid phase extraction (SPE) has long been used as a sample preparation technique, capable of matrix simplification by removing unwanted analytes, as well as trace enrichment for analytes of interest.

For SPE applications, typical adsorbents consist of silica, carbon or other adsorbents typically used as liquid chromatography (LC) and HPLC packing. These adsorbents are limited first in the unwanted analytes that can be removed from a sample as each may work well for some classes of analytes, but not as well for others. Additionally, these materials must be activated or pre-treated prior to use to allow for optimal performance, adding additional steps and time necessary for an analysis. Additionally, performance can be lost if the material is allowed to dry during use—a problem known as the overdrying effect.

Although the number and variety of analytes in any given sample has posed a great challenge, the discovery of hydrophilic-lipophilic balance (HLB) polymers for solid phase extraction (SPE) has increased the feasibility of the idea of a generic SPE sorbent. HLB technology is the most widely used SPE material due to the versatility and wide range of analytes encompassed. HLB resins are copolymers made up of a hydrophilic monomer and a lipophilic monomer. Although still considered a reversed-phase sorbent, the presence of the hydrophilic monomer increases the retention of polar analytes, allowing a single extraction to be effective for a wide range of analytes (e.g., acids, neutrals, bases, polar, and non-polar).

Currently, there are several HLB SPE products on the market. The most common HLB sorbent is a co-polymer containing N-vinylpyrrolidone (VP) as the hydrophilic component and divinylbenzene (DVB) as the lipophilic monomer.

While widely used for HLB SPE applications, the nature of vinylpyrrolidone-divinylbenzene copolymers, however, limits their usefulness. These vinylpyrrolidone and divinylbenzene copolymers are not repeatable and result in retention and peak shape variability in chromatographic separation processes. The water solubility of vinylpyrrolidone results in the polymerization of the vinylpyrrolidone at the co-monomer droplet/water interface during the suspension polymerization process. The use of vinylpyrrolidone, which is also extensively used as a surface surfactant in suspension polymerization processes, leads to irreproducibility in the copolymer sequence. Therefore, an increase in the divinylbenzene (hydrophobic) surface in the deeper pores of the spherical, porous polymer leads to biased selectivity within the porous copolymer. This biased selectivity has limited the development of HLB adsorbents capable of effectively adsorbing analytes over a wide range of sizes and chemistries. A need exists for improved HLB adsorbents that can effectively, and simultaneously, remove analytes that vary greatly in both size and properties.

Additionally, conventional SPE products typically follow a traditional SPE workflow having 5 steps: conditioning, equilibration, loading, washing, and elution. The ability of a HLB sorbent to successfully extract a variety of analytes can reduce the total number of extractions that are required, however the process can still be quite time consuming. While some HLB adsorbents have been adapted to work in a simplified process, a need still exists for improved HLB adsorbents capable of extracting analytes without the need for conditioning and equilibrium steps.

Accordingly, it would be useful to develop new polymeric adsorbents useful for SPE and other separation techniques. Ideally, the new polymers would be useful for efficient, simultaneous extraction of analytes of varying properties including acids, bases, neutral analytes, strongly polar, moderately polar, and non-polar analytes, and of varying size, including small molecules and large molecules, in a variety of solvents and over a wide pH range. Such new polymeric adsorbents should ideally be resistant to overdrying effects seen with many conventional adsorbents, thus allowing their use in a simplified workflow.

SUMMARY

Provided herein are improved hydrophilic-lipophilic balance polymeric adsorbents for solid phase extraction (SPE) including a divinylbenzene-acrylonitrile copolymer capable of simultaneously adsorbing a plurality of analytes. Such analytes may include acids, bases, neutrals, strongly polar, moderately polar, and non-polar analytes, and may include small molecules, large molecules, or a combination of both.

In some embodiments, the polymer adsorbents may be spherical particles. In some embodiments, the polymeric adsorbents may be coated on or bonded to a substrate, such as a particle or fiber. In other embodiments, the polymer adsorbents may be formed into a substrate.

Also provided are methods for removing one or more solutes from a solution by contacting the solution with the provided polymeric adsorbent. The methods provided are useful for both nonpolar and polar solvents and are useful over a broad range of pH values. The methods provided can remove a plurality of different solutes having varying properties.

DETAILED DESCRIPTION

The HLB copolymers described herein, also referred to as adsorbents, offer improved separation and removal of a wide variety of analytes of varying properties, including acids, bases, neutral analytes, strongly polar, moderately polar, and non-polar analytes, and of varying size, including small molecules and large molecules, in a variety of solvents. Additionally, they are suitable for use without the need for conditioning and equilibrium steps within the SPE workflow. In addition to being useful for solid phase extraction (SPE) techniques, they are also suitable for solid phase microextraction (SPME) and can also be adapted for HPLC or UHLPC columns.

The HLB adsorbents for solid phase extraction (SPE) are formed by copolymerizing at least one hydrophobic monomer and at least one hydrophilic monomer. In a preferred embodiment, the hydrophobic monomer includes divinylbenzene and the hydrophilic monomer includes acrylonitrile. Other hydrophobic monomers that could be used in addition to divinylbenzene include monovinyl and polyvinyl monomers such as styrene, trivinylbenzene, divinyltoluene, divinylnaphthalene, divinylpyridine, vinylpyridine, ethylvinylbenzene and divinylxylene. Non-aromatic monomers such as 1,5-hexadiene, 2,5-dimethyl-hexadiene, 1,7-octadiene, trivinylcyclohexane, polyvinylidine chloride, polyvinyl chloride, and combinations thereof are included. Other hydrophilic monomers that can be used in addition to acrylonitrile include methyl methacrylate, ethyl methacrylate, ethylene glycol diacrylate, diethyleneglycol divinyl ether, 2-cyanoethyl methacrylate, dimethacrylic ester, vinylquinolines and combinations thereof. In a particularly preferred embodiment, the copolymer adsorbent includes only divinylbenzene and acrylonitrile.

Figure 8:
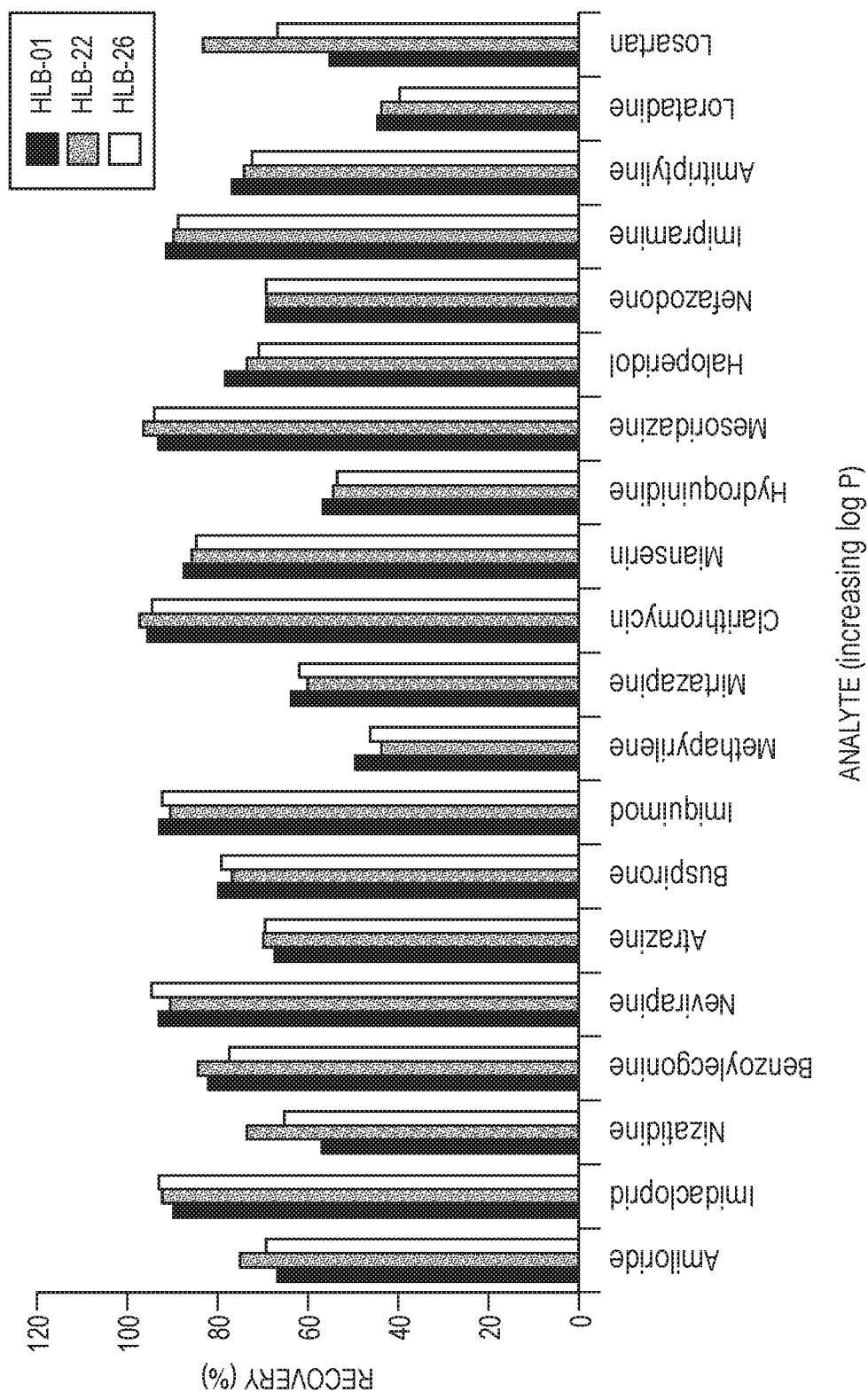
FIG. 8 shows the absolute recoveries of 20 analytes extracted from spiked serum under acidic conditions using experimental resins HLB-01, HLB-22, and HLB-26.

Although not traditionally used in HLB copolymers, acrylonitrile is particularly preferred as the hydrophilic monomer in the HLB copolymers described herein, as it has been found that it offers many advantages over the traditional hydrophilic monomer used in HLB adsorbents, N-vinylpyrrolidone. With a log P of 0.25, it is more hydrophilic than N-vinylpyrrolidone (log P of 0.37). Acrylonitrile is also more effectively incorporated within the polymer across a broader range of monomer ratios, thus allowing for an ability to extract incredibly hydrophilic analytes (log P<0) and very lipophilic analytes (log P>6), simultaneously, as shown in FIG. 8, discussed below.

Acrylonitrile is also a hygroscopic material, a fact that led to it being used in the development of the super sluper polymer by the U.S. F.D.A. in the 1960s—a polymer that was able to hold 400× its weight. The inventors have found that utilizing a hygroscopic monomer allows for improved performance of this material for SPE and SPME. This allows the material to perform well without the need for a pretreatment step, commonly referred to as conditioning and equilibration. Therefore, the SPE procedure can be simplified from 5 total steps (conditioning, equilibration, sample loading, washing, and elution) to either 3 steps (sample loading, washing, and elution) or 1 step (sample loading/elution).

In a preferred embodiment, a porogen is added to the synthesis process to control the pore size distribution of the HLB copolymer. Porogens, formerly referred to as phase extenders, are solvents that are added to polymerization to affect the properties of the polymer being formed. Porogens can affect many properties of a polymer, including, but not limited to surface area, pore volume, pore size, porosity, and hydrophobic-hydrophilic properties. Particular porogens, or combinations of porogens are preferably added to tune the properties of the resulting polymer.

Suitable porogens include nonpolar or hydrophobic; and polar, or hydrophilic, solvents, and combinations of nonpolar and polar solvents. In a preferred embodiment, a combination of nonpolar and polar porogens are used. Preferred nonpolar porogens used in the preparation of the HLB copolymers described herein include toluene, xylenes, benzene, hexane, cyclohexane, pentane, heptane, octane, nonane, decane, dodecane, isooctane, dichloromethane, chloroform, carbon tetrachloride, and combinations thereof. Preferred polar porogens used in the preparation of the HLB copolymers described herein include benzyl alcohol, butanol, pentanol, hexanol, heptanol, 4-methyl-2-pentanol, isoamyl alcohol, dodecanol, ethyl acetate, 2-ethylhexanol, cyclohexanol, and combinations thereof. One skilled in the art would also be able to choose additional suitable nonpolar and polar porogens to tune the properties of the resulting polymers. In a particularly preferred embodiment, a combination of o-xylene and 4-methyl-2-pentanol are used for porogens.

In accordance with the methods described herein, the ratio of divinylbenzene and acrylonitrile monomers used in forming the polymeric adsorbent can vary greatly while still achieving suitable separation properties necessary for an HLB polymer.

In some embodiments, the ratio of hydrophobic monomer to hydrophilic monomer is in the range from 10:90 (wt. %) to 90:10 (wt. %). In further embodiments, ratio of hydrophobic monomer to hydrophilic monomer is in the range from 30:70 (wt. %) to 70:30(wt. %). In further embodiments the ratio of hydrophobic monomer to hydrophilic monomer is in the range from 15:85 (wt. %) to 85:15 (wt. %); from 20:80 (wt. %) to 80:20 (wt. %); from 25:75 (wt. %) to 75:25 (wt. %); from 30:70 (wt. %) to 70:30 (wt. %), from 35:65 (wt. %) to 65:35 (wt. %); from 40:60 (wt. %) to 60:40 (wt. %); from 55:45 (wt. %) to 45:55 (wt. %); or approximately 50:50 (wt. %). In a preferred embodiment, the ratio of hydrophobic monomer to hydrophilic monomer is about 63:37 (wt. %).

In one preferred embodiment, the polymeric adsorbent is poly(divinylbenzene-co-acrylonitrile). In some embodiments, the ratio of divinylbenzene to acrylonitrile is in the range from 90:10 (wt. %) to 10:90 (wt. %). In further embodiments the ratio of divinylbenzene to acrylonitrile is in the range from 15:85 (wt. %) to 85:15 (wt. %); from 20:80 (wt. %) to 80:20 (wt. %); from 25:75 (wt. %) to 75:25 (wt. %); from 30:70 (wt. %) to 70:30 (wt. %), from 35:65 (wt. %) to 65:35 (wt. %); from 40:60 (wt. %) to 60:40 (wt. %). In one preferred embodiment, the ratio of divinylbenzene to acrylonitrile is about 75:25 (wt. %). In still further preferred embodiments, the ratio of divinylbenzene to acrylonitrile is about 63:37 (wt. %).

In certain preferred embodiments, the polymeric adsorbent disclosed herein is adapted to simultaneously adsorb a plurality of analytes including acids, bases, neutrals, strongly polar, moderately polar, and non-polar analytes. Exemplary analytes may include small molecules, large molecules, proteins, phospholipids, and pharmaceutically relevant molecules.

Some typical analytes of interest may include, but are not limited to compounds fitting into these broad classes: essential oils, food preservatives, vitamins, plasticizers, pesticides, steroids, hydrocarbons, pollutants, amines, alcohols, dyes, phenols, alkaloids, mycotoxins, amino acids, flavonoids, heterocyclic compounds, lipids, steroids, organic acids, terpenes, surfactants, carbohydrates, catecholamines, antibiotics, amino acids, nucleic acids, nucleic acid bases, proteins, and peptides.

Some non-limiting examples of pharmaceutical analytes of interest include: acetaminophen, amiloride, amitriptyline, atrazine, benzoylecgonine, buspirone, clarithromycin, 2,7-dihydroxynaphthalene, doxepin, haloperidol, hydroquinidine, imidacloprid, imipramine, imiquimod, loratadine, losartan, mesoridazine, methapyrilene, mianserin, mirtazapine, nefazodone, nevirapine, nizatidine, procainamide, propranolol, and p-toluamide.

In certain embodiments, the polymeric adsorbent is a porous spherical particle. When spherical particles are desired, the particle size is not particularly limited. Particles can be formed with favorable, reproducible particle size distributions over a wide range, allowing use of these HLB copolymers in a variety of applications, including, but not limited to SPE, SPME and HPLC.

In various embodiments, the HLB adsorbents may be porous spherical particles having a diameter in the range from about 10 nm to about 1 mm. In some embodiments, the porous spherical particles have diameters in the range from about 20 μm to about 125 μm. In certain embodiments, the porous spherical particle has a diameter in the range from about 30 μm to about 85 μm. For use in SPE, the spherical particles have a diameter in the range from about 40 to about 75 μm. In a preferred embodiment for SPE, the spherical particles have a diameter of approximately 50 μm. In some embodiments, the porous spherical particle has a diameter in the range from about 10 nm to about 10 μm. For SPME, the spherical particles preferably have a diameter in the range from about 0.5 μm to about 4 μm; and more preferably, a diameter in the range from about 0.8 μm to about 2 μm. The use of monodispersed particle sizes is desirable for improved sample preparation processes.

In some embodiments, the porous spherical particles have a surface area in the range from about 10 $m^2/g$ to 1000 $m^2/g$. In some embodiments, the porous spherical particles have a surface area in the range from about 350 $m^2/g$ to about 675 $m^2/g$. In some embodiments, the surface area is about 350 $m^2/g$; in other embodiments, the surface area is about 375 $m^2/g$, in other embodiments, the surface area is about 400 $m^2/g$; in other embodiments, the surface area is about 425 $m^2/g$; in other embodiments, the surface area is about 450 $m^2/g$; in other embodiments, the surface area is about 475 $m^2/g$; in other embodiments, the surface area is about 500 $m^2/g$; in other embodiments, the surface area is about 525 $m^2/g$; in other embodiments, the surface area is about 550 $m^2/g$; in other embodiments, the surface area is about 575 $m^2/g$; in other embodiments, the surface area is about 600 $m^2/g$; in other embodiments, the surface area is about 625 $m^2/g$; in other embodiments, the surface area is about 650 $m^2/g$; in still other embodiment, the surface area is about 675 $m^2/g$; and in still other embodiments, the surface area is about 700 $m^2/g$.

In some embodiments, the porous spherical particles have an average pore diameter in the range from about 50 Å to about 105 Å. Moreover, the average pore diameter for the HLB adsorbents described herein may be about 50 Å, about 55 Å, about 60 Å, about 65 Å, about 70 Å, about 75 Å, about 80 Å, about 85 Å, about 90 Å, about 95 Å, about 100 Å, about 105 Å, or about 110 Å.

In certain embodiments, the polymeric adsorbent is coated on a substrate. Suitable substrates may include carbon, silica, and metal, among other things. In some embodiments, the may be particulate, while in other embodiments, the substrate may be a fiber.

When the substrate is a fiber, the polymeric adsorbent may be coated directly onto the fiber. In some embodiments, an adhesive or a binder is used to adhere the polymeric adsorbent to the fiber. Suitable binders are known to those skilled in the art. Some non-limiting examples of adhesives that may be used in accordance with the HLP adsorbents described herein includes, polydimethylsiloxane (PDMS), epoxy resins, polysilazane, acrylic resins, phenol formaldehyde resins, polyvinyl acetate (PVA, white glue), yellow carpenter's glue (aliphatic resin), polyvinylpyrrolidone (PVP or PVA based), polyester resin, resorcinol resin, urea-resin glue (plastic resin) or combinations thereof. A particularly preferred adhesive is polydimethylsiloxane (PDMS). The use of PDMS as a binder to adhere adsorbents to a structure is disclosed in U.S. Pat. Nos. 5,559,445 and 7,815,864, for example, the entirety of the patents is incorporated herein by reference. In other embodiments, a binder, i.e., that does not exhibit cross-linking characteristics, can be used. Such binders may include, but are not limited to polyacrylonitrile (PAN), TEFLON (PTFE and similar fluorinated polymers/plastics), gelatin, cellulose, cellulose derivatives, polyvinylpyrrolidone, starch, sucrose and polyethylene glycol.

Notably, unlike conventional HLB coated fibers, the HLB fibers provided herein may be used without a conditioning step. As explained above, this simplification of the extraction process is very desirable from a time standpoint, allowing for analysis of many more samples in a shorter length of time.

Also provided are methods for removing one or more solutes from a solution by contacting the solution with a polymeric adsorbent as described herein whereby the solute is adsorbed onto the polymeric adsorbent. In some embodiments, the solute may then be eluted from the polymeric adsorbent.

In some embodiments of this method, the solution has a polar solvent. In a preferred embodiment, the polar solvent is an aqueous solvent. In another preferred embodiment, the polar solvent is an organic solvent.

In accordance with the methods provided herein, the HLB adsorbents are useful for removing at least 6 solutes, interfering analytes, or analytes of interest from a solution. In some embodiments, the HLB adsorbents are useful for removing at least 8 solutes from a solution. In further embodiments, the HLB adsorbents are useful for removing at least 10 solutes from a solution. In still further embodiments, the HLB adsorbents are useful for removing at least 15 solutes from a solution. In a preferred embodiment, the HLB adsorbents are useful for removing at least 20 solutes from a solution. In accordance with the methods provided herein the HLB adsorbents are useful for removing a several different types of solutes, interfering analytes, or analytes of interest from a solution. The solutes, interfering analytes, or analytes may include one or more proteins, one or more pharmaceutically relevant analytes, and one or more phospholipids.

In a preferred embodiment, the HLB adsorbents remove at least about 75% of the solutes are removed from the solution with a recovery of at least 50%. In another preferred embodiment, the HLB adsorbents remove at least about 80% of the solutes are removed from the solution with a recovery of at least 50%. In another preferred embodiment, the HLB adsorbents remove at least about 85% of the solutes are removed from the solution with a recovery of at least 50%. In another preferred embodiment, the HLB adsorbents remove at least about 90% of the solutes are removed from the solution with a recovery of at least 50%. In yet another preferred embodiment, the HLB adsorbents remove at least about 95% of the solutes are removed from the solution with a recovery of at least 50%.

In still another preferred embodiment, the HLB adsorbents remove at least about 75% of the solutes are removed from the solution with a recovery of at least 70%. In another preferred embodiment, the HLB adsorbents remove at least about 80% of the solutes are removed from the solution with a recovery of at least 70%. In another preferred embodiment, the HLB adsorbents remove at least about 85% of the solutes are removed from the solution with a recovery of at least 70%. In another preferred embodiment, the HLB adsorbents remove at least about 90% of the solutes are removed from the solution with a recovery of at least 70%. In another preferred embodiment, the HLB adsorbents remove at least about 95% of the solutes are removed from the solution with a recovery of at least 70%.

Also provided is a method for selective removal of interfering solutes from a solution comprising the step of contacting the solution with a polymeric HLB adsorbent as described herein, wherein the solutes are either adsorbed onto the polymer, or washed off the polymer in the wash step of the method, and wherein the solutes are selected from the group consisting of proteins, phospholipids, inorganic salts, combinations thereof, and wherein at least about 90% of the interfering solutes are removed.

Also provided are cartridges containing the HLB adsorbents described herein. In some embodiments, the cartridges include spherical particles of HLB adsorbent. In other embodiments, the cartridges include spherical silica particles coated with the HLB adsorbent.

The HLB materials described herein may be referred to as "polymers," "copolymers," "resins," and "adsorbents" interchangeably. Any of these terms may be substituted for another and the use of one term over another does not connote a difference in the composition or the function of the HLB material.

The HLB adsorbents described herein are useful for adsorbing analytes, either for the function of removal for purification or removal for concentrating. It is understood "removing" or "adsorbing" may be used interchangeably or substituted with other terms such as "extracting" without changing the meaning. It is further understood that the terms "analytes," "analytes of interest," "solutes," and "interfering solutes" may be used interchangeably as the substances that are adsorbed or removed by the HLB copolymers described herein.

The procedures, experiments and examples provided herein are meant to be illustrative of the improved HLB copolymers provided herein and are not meant to limit the invention.

The following illustrates the synthesis, use, and properties of the HLB copolymers described herein. To illustrate the improved properties of these polymers, the new HLB copolymers described herein were tested against various conventional HLB adsorbents currently available, identified as Conventional HLB A, Conventional HLB B, Conventional HLB C, and so forth, and those labels are used consistently with the same materials throughout.

As described above, the HLB copolymers described herein are copolymers of divinylbenzene (DVB) and acrylonitrile (AN) made using a suspension or dispersion polymerization process.

Figure 1:
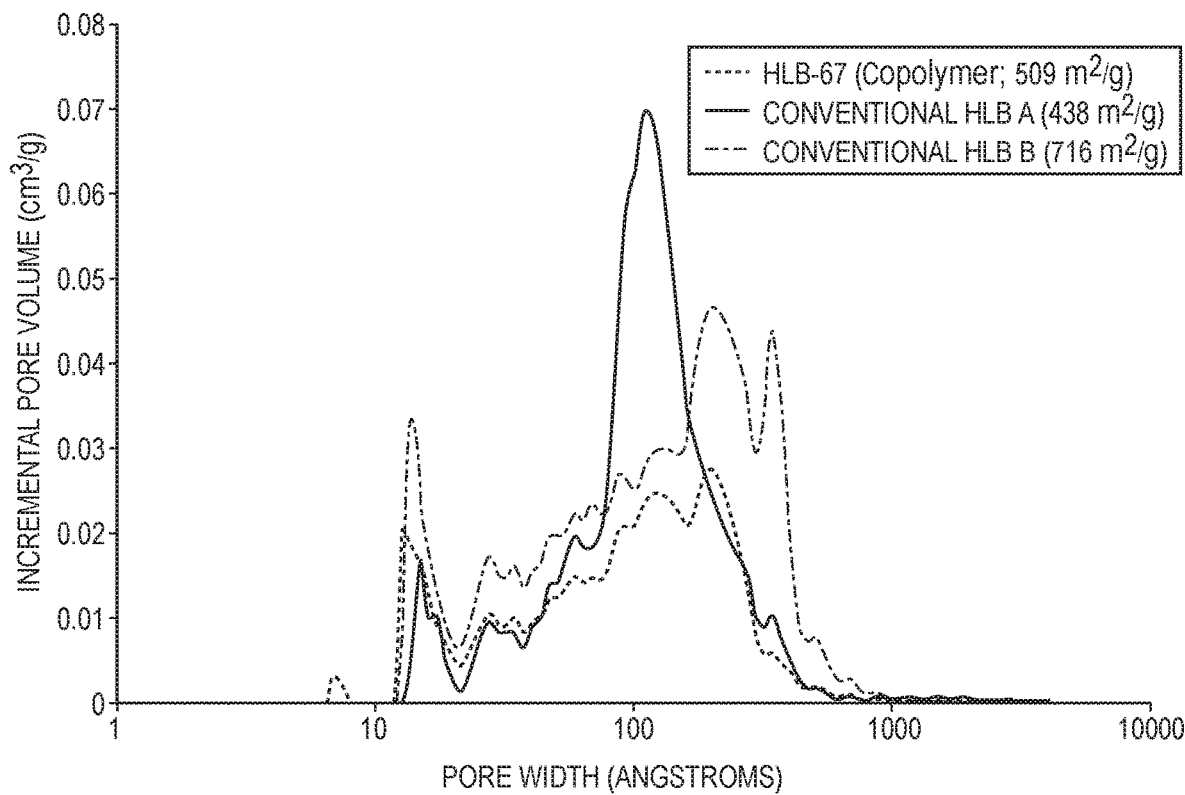
FIG. 1 is a pore plot overlay illustrating the pore structure of the HLB adsorbent described herein (HLB-67) and two conventional HLB products.

FIG. 1 shows a pore plot overlay illustrating the pore structure of one of the HLB copolymer adsorbents described herein, Conventional HLB A and Conventional HBL B materials. The DVB/AN copolymer was prepared using both hydrophobic and hydrophilic phase extenders, to achieve the necessary microporosity and mesoporosity, as shown in Table 1.

TABLE 1

Copolymer surface area and porosity of conventional products and several HLB copolymers described herein

| Resin ID | Diameter (μm) | Surface area (m²/g) | Single point total pore volume (mL/g) | Average pore diameter (Å) |
| --- | --- | --- | --- | --- |
| Conventional HLB A | | 438 | 1.04 | 95 |
| Conventional HLB B | | 716 | 1.29 | 72 |
| Conventional HLB C | | 201 | 0.958 | 190 |
| HLB-96 | 38-75 | 423 | 1.02 | 97 |
| HLB-99 | 38-75 | 448 | 1.17 | 105 |
| HLB-100 | 38-75 | 667 | 1.21 | 73 |
| HLB-01 | 38-75 | 346 | 0.74 | 85 |
| HLB-03 | 38-75 | 401 | 0.67 | 66 |
| HLB-05 | 38-75 | 658 | 0.82 | 50 |

Example: Synthesis of an Exemplary HLB copolymer. An organic phase was prepared by combining a mixture of technical grade divinylbenzene (100 g), technical grade acrylonitrile (43 g), benzoyl peroxide (6.9 g), o-xylene (54 g) and 4-methyl-2-pentanol (54 g). An aqueous phase was prepared by combining: sodium dodecyl sulfate (1.2 g), culminal (1.2 g, high molecular weight methyl cellulose), boric acid (32 g) and bulk water (794 g). The organic phase was charged to the aqueous phase in a reactor. Agitation was applied to disperse the organic phase into fine droplets, and the reactor was heated to 80° C. for approximately 16 hours to initiate and complete polymerization. The result was a spherical, white powder with a yield of approximately 140 g.

Figure 2:
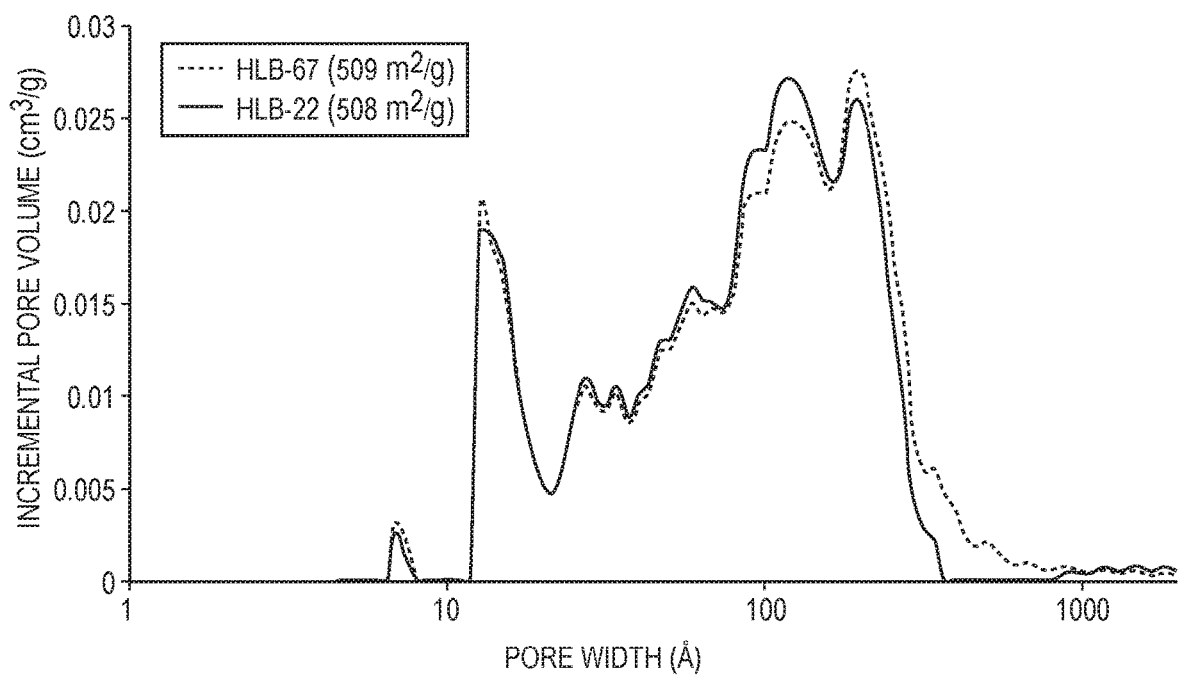
FIG. 2 is a chart illustrating the batch to batch synthetic reproducibility of the HLB copolymers described herein.

The HLB copolymers made by the process described herein were found to have good batch to batch synthetic reproducibility, as shown in FIG. 2. As illustrated in FIG. 2, the pore strucure was shown to be reproducible throughout the microporous and mesoporous ranges to one batch to the next.

HLB copolymer coated Silica The process of coating the silica is as follows. First, HPLC grade silica (3.0 μm, 300 Å), is vacuum dried overnight at 140° C. The dried silica is charged to a rotary evaporator flask. Divinylbenzene (4.5 g), acrylonitrile (1.5 g), benzoyl peroxide (0.18 g) and dichloromethane (90 g, bulk solvent) are pre-mixed, then the premixed solution is charged to the flask. The flask is rotated at 50 rpms for 2 hours at ambient temperature to allow for equilibration. The flask is heated stepwise to slowly evaporate the dichloromethane, as follows: (1) hold two hours at ambient conditions; (2) raise the temperature from ambient to 60° C. and hold for one hour; (3) hold for one hour at 60-65° C.; then (4) raise the temperature from 65 to 80° C. and hold 16 hours. The silica may also be encapped, for example with trimethylchlorosilane or oleic acid, prior to polymer coating.

For SPME, copolymer coated silica possesses a typical particle size range of 2 to 4 μm, and possesses similar pore structure and surface chemistry characteristics to the silica hard template. However, it is noted that the copolymer coated silica can be in the range from about 30 nm to about 5 μm, depending on the application of interest.

Figure 3A:
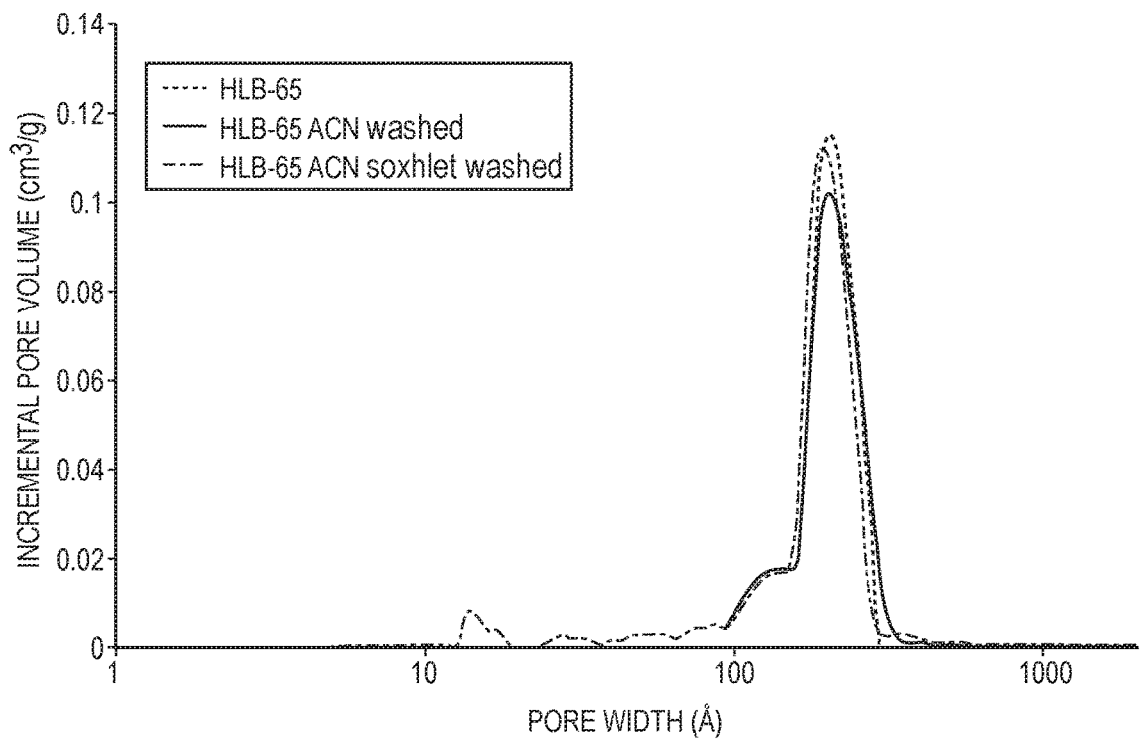
FIG. 3A shows a density functional theory (DFT) plot for experimental HLB adsorbent HLB-65 on silica particles before and after washing with acetonitrile.
Figure 3B:
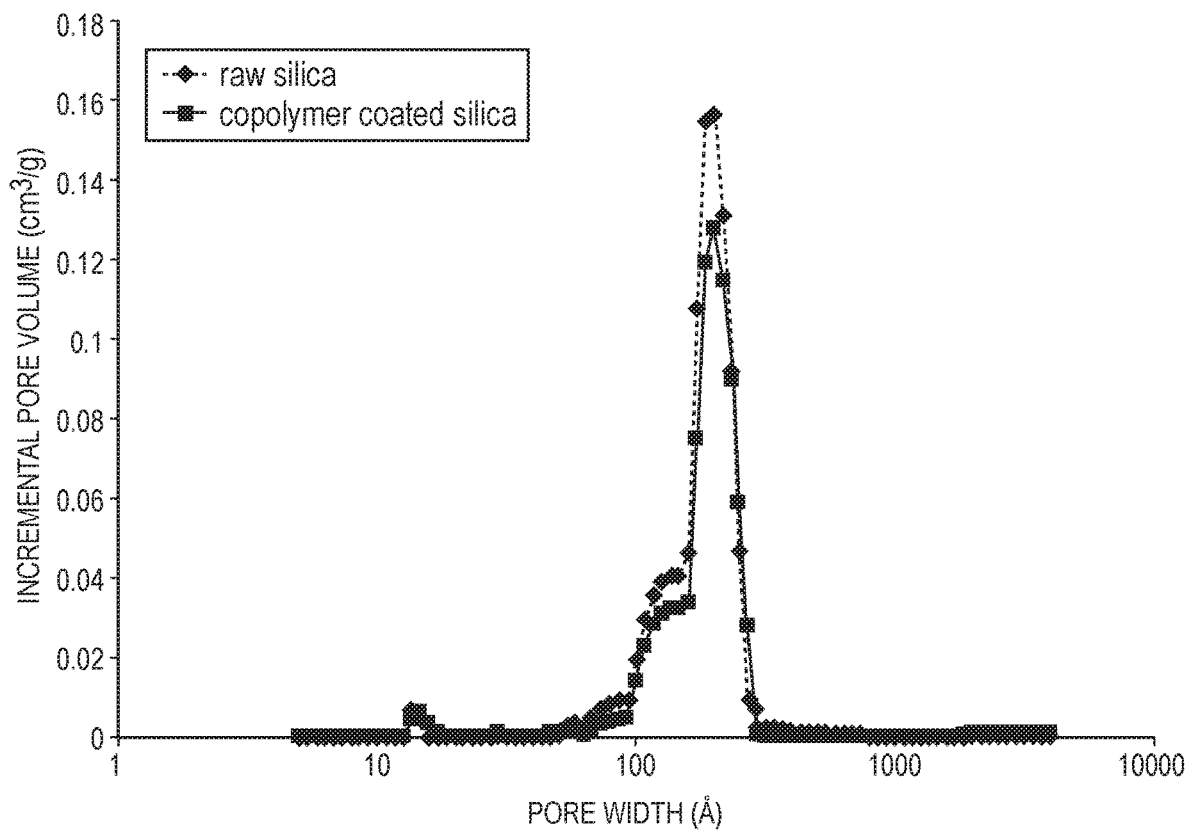
FIG. 3B shows a density functional theory (DFT) pore plot illustrating the uniform pore decrease using the silica coating process described herein.
Figure 4:
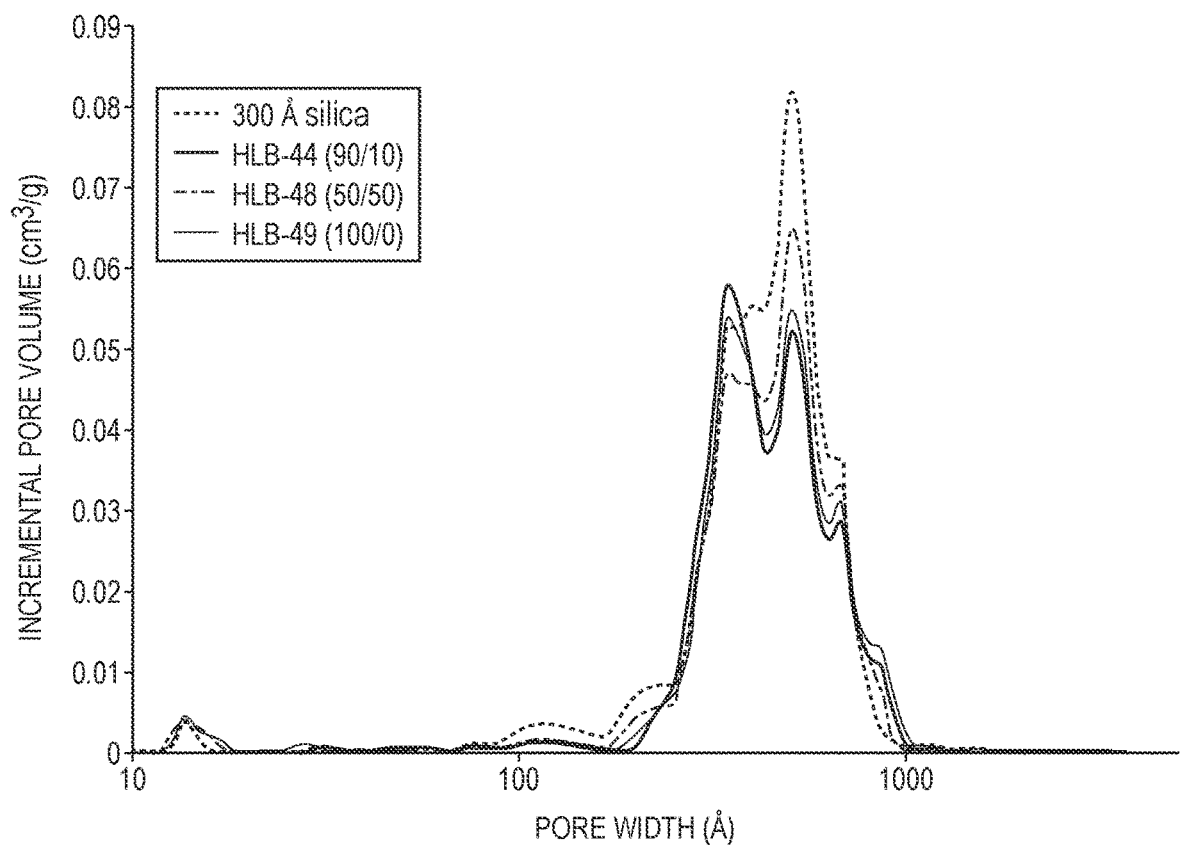
FIG. 4 shows a DFT overlay plot for three experimental HLB adsorbents, HLB-44, HLB-48, and HLB-49, having varying copolymer ratios.

To investigate the suitability of coating the HLB copolymers described herien on silica, example HLB-65 was chosen. The silicas chosen for this material possessed pore diameters of: 100 Å, 200 Å and 300 Å. To ensure copolymerization of the DVB and ACN monomers on the surface of the silica, wash procedures were chosen to determine copolymer loss. No loss was detected, as shown in FIG. 3A. FIG. 3B illustrates the uniform pore decrease using the above-mentioned silica coating process. FIG. 4 illustrates the coatings using varying copolymer ratios.

The effect of washing on analyte recovery was investigated using experimental HLB copolymer HLB-65. The testing used the procedures for analsys of twenty analytes described below. The results are summarized in Table 2, Table 3, and Table 4 below.

TABLE 2

Effect of washing on absolute recoveries obtained using experimental HLB-65.
Number of Analytes (Absolute Recoveries)

| Recovery (%) | HLB-65 W (Neutral) No dry down | HLB-65 sox (Neutral) No dry down | HLB-65 W (Acidic) No dry down | HLB-65 sox (Acidic) No dry down |
|---|---|---|---|---|
| >70% | 8 | 12 | 8 | 17 |
| 50-70% | 11 | 8 | 6 | 3 |
| <50% | 6 | 5 | 11 | 5 |

TABLE 3

Effect of washing on matrix matched recoveries obtained using experimental HLB-65.
Number of Analytes (Matrix Matched Recoveries)

| Recovery (%) | HLB-65 W (Neutral) No dry down | HLB-65 sox (Neutral) No dry down | HLB-65 W (Acidic) No dry down | HLB-65 sox (Acidic) No dry down |
|---|---|---|---|---|
| >70% | 18 | 17 | 12 | 20 |
| 50-70% | 2 | 4 | 5 | 1 |
| <50% | 5 | 4 | 8 | 4 |

TABLE 4

Effect of washing on relative recoveries obtained using experimental HLB-65.
Number of Analytes (Relative Recoveries)

| Recovery (%) | HLB-65 W (Neutral) No dry down | HLB-65 sox (Neutral) No dry down | HLB-65 W (Acidic) No dry down | HLB-65 sox (Acidic) No dry down |
|---|---|---|---|---|
| >120% | 3 | 3 | 3 | 1 |
| 80-120% | 11 | 6 | 7 | 12 |
| <80% | 1 | 6 | 5 | 3 |

Figure 5:
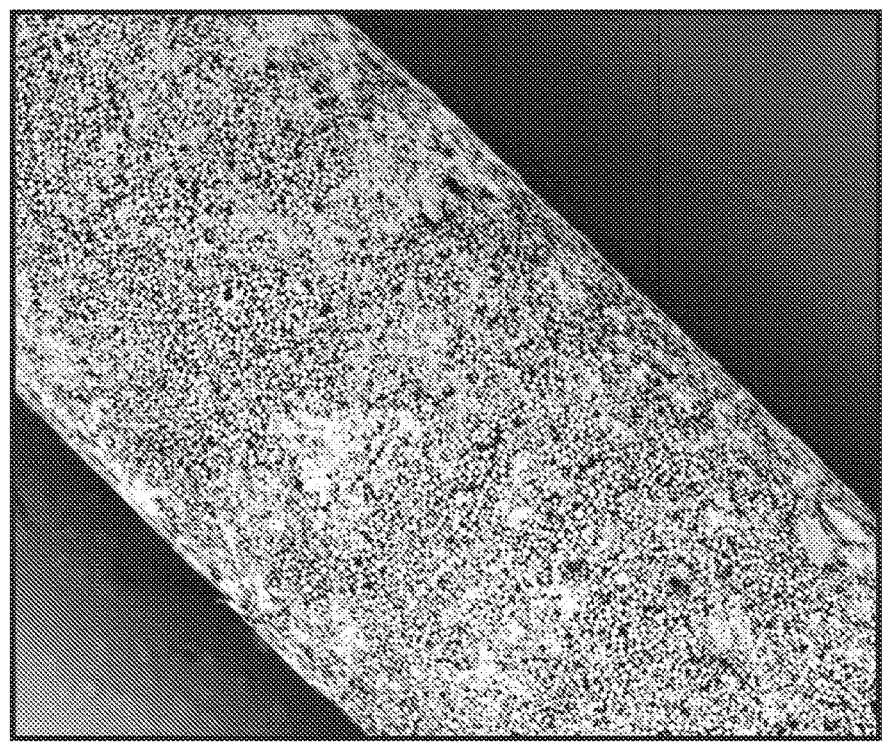
FIG. 5 is a scanning electron micrograph of an HLB polymer bonded to a SPME fiber.

For illustration, FIG. 5 is an scanning electron micrograph of a typical silica coated SPME fiber. The adhesive used for the bonding of the 3.0 um polymer coated silica is the polydimethylsiloxane (PDMS) described herein.

Further evaluation of the HLB copolymers described herein was done as follows:

Analyte recovery evaluations: Six Analyte Preliminary Screen. A 1 mg/mL stock was prepared by solvating 50 mg of the following analytes in 50 mL of methanol: acetaminophen, procainamide, p-toluamide, 2,7-dihydroxynaphthalene, propranolol, and doxepin. A 10 μg/mL analytical stock was prepared by transferring 500 μL of 1 mg/mL stock into 49.5 mL of 20 mM potassium phosphate buffer. Reagents were prepared using volumetric flasks filled according to standard procedure.

For experimental resins or conventional comparisons, 3 mL SPE cartridge formats with 60 mg bed weights were utilized. Samples were processed utilizing the protocol described in Table 5.

TABLE 5

3-step SPE protocol used for basic screening.

SPE Protocol
Load: 1 mL sample in 20 mM phosphate buffer
Wash: 1 mL 5% methanol aq.
Elute: 1 mL 90:10 ACN:Methanol

TABLE 5-continued 3-step SPE protocol used for basic screening.

Evaporate: 40° C., 10 psi nitrogen stream
Reconstitute: 1 mL 20 mM phosphate buffer Drop rates were maintained at 1 drop per second or less. Analyte stocks were initially dissolved in methanol at 1 mg/mL concentrations and were then diluted to 10 μg/mL in 20 mM potassium phosphate buffer (pH 7) to produce the loading stock. After evaporation all samples were vortexed 30 seconds in 20 mM potassium phosphate buffer (pH 7) to reconstitute for analysis. Three aliquots of 10 μg/mL loading solution were analyzed and the average area count for each compound was used as a reference to calculate recovery of the respective compounds.

HPLC parameters. Analysis was performed using an Agilent 1190 HPLC coupled with a UV detector. Method parameters can be found in Table 6.

TABLE 6

HPLC-UV parameters for analysis of 6 analyte preliminary screening.
HPLC Instrument Parameters

| Column | Discovery ® C18, 5 cm × 4.6 mm × 5 μm (Sigma-Aldrich) |
|---|---|
| Mobile phase A | 20 mM potassium phosphate |
| Mobile phase B | MeOH |
| Injection volume | 25 μL |

| Gradient | Time (min) | A % | B % |
|---|---|---|---|
| | 0.0 | 95 | 5 |
| | 2.00 | 95 | 5 |
| | 3.00 | 65 | 35 |
| | 7.00 | 65 | 35 |
| | 8.00 | 30 | 70 |
| | 12.00 | 30 | 70 |
| | 12.10 | 95 | 5 |
| | 20.00 | 95 | 5 |

| Wavelength | 230 nm |
|---|---|
| Flow | 1.0 mL/min |

Protocol I: this protocol utilized a 20 analyte mix consisting of the following: amiloride, amitriptyline, atrazine, benzoylecgonine, buspirone, clarithromycin, haloperidol, hydroquinidine, imidacloprid, imipramine, imiquimod, loratadine, mesoridazine, methapyrilene, mianserin, mirtazapine, nefazodone, nevirapine, nizatidine, and losartan. For acidic matrix extractions, newborn calf serum was spiked with analyte at a concentration of 200 ng/mL. The spiked serum was then diluted 1:1 with a 0.4% formic acid solution. These solutions were also spiked with an internal standard mixture, allowing for final concentrations of 100 ng/mL analyte and 50 ng/mL internal standards. The SPE procedure is described in Table 7.

It is noted that all cartridges containing experimental materials were packed with soxhlet washed polyethylene frits in order to remove lipophilic interferences that would otherwise be co-extracted with the analytes.

TABLE 7

SPE procedure used for Protocol I.

SPE Procedure
Load 1 mL sample onto a dry bed (60 mg bed weight).
Wash cartridge with 1 mL of 5% MeOH (aq.)
Elute with 1 mL of elution solvent.

TABLE 7-continued

SPE procedure used for Protocol I.

Evaporate samples to dryness at 40° C. with 5 psi nitrogen stream.
Reconstitute in 1 mL of starting mobile phase.

Protocol O: Newborn calf serum was diluted 1:1 with 4% phosphoric acid (final analyte concentration: 100 ng/mL; final internal standard concentration: 50 ng/mL). The previously described procedure was followed using 100% MeOH as the elution solvent. Sample eluates were dried down and reconstituted in the starting mobile phase. Samples were also prepared following a "5-step protocol", this simply involved adding a conditioning (1 mL MeOH) and equilibration (1 mL water) step prior to sample loading. The 20 analyte mix was used for this evaluation.

It is noted that all cartridges containing experimental materials were packed with soxhlet washed polyethylene frits in order to remove lipophilic interferences that would otherwise be co-extracted with the analytes.

Protocol P: Newborn calf serum was diluted 1:1 with 4% phosphoric acid (final analyte concentration: 100 ng/mL; final internal standard concentration: 50 ng/mL). The procedure described in Table 5 was followed using 100% MeOH as the elution solvent. Sample eluates were directly analyzed via LC-MS/MS. An eight analyte mix containing azidothymidine, phenacetin, betamethasone, alprazolam, naproxen, propranolol, protriptyline, and amitriptyline was used for this evaluation.

It is noted that all cartridges containing experimental materials were packed with soxhlet washed polyethylene frits in order to remove lipophilic interferences that would otherwise be co-extracted with the analytes.

LC-MS/MS Analysis: Analysis of Protocol I and Protocol O HLB protocol samples. Samples were analyzed using an Agilent 1290 Infinity UHPLC coupled with an Agilent 6460 triple quadrupole mass spectrometer. Table 8 and Table 9 display the specific UHPLC and MS source parameters. Table 10 and Table 11 display the compounds specific MS parameters for the analysis of analytes in positive and negative mode, respectively.

TABLE 8

UHPLC instrument parameters used for analysis of in-house protocol and conventional 5-step protocol samples.
UHPLC Instrument Parameters

| Column | Ascentis ® Express RP-Amide; 10 cm × 2.1 mm; 2.7 μm (Sigma-Aldrich) |
|---|---|
| Column Temp. (° C.) | 40 |
| Mobile Phase A | 0.1% acetic acid, 5 mM ammonium acetate |
| Mobile Phase B | 5 mM ammonium acetate in acetonitrile |
| Flow rate (mL/min) | 0.4 |
| Injection Volume (μL) | 2.00 |

| Gradient | Time (min) | A % | B % |
|---|---|---|---|
| | 0.00 | 95.0 | 5.0 |
| | 1.00 | 95.0 | 5.0 |
| | 7.00 | 57.0 | 43.0 |
| | 8.00 | 57.0 | 43.0 |
| | 10.00 | 38.5 | 61.5 |
| | 11.00 | 95.0 | 5.0 |
| | 14.00 | 95.0 | 5.0 |

TABLE 9

MS source parameters used for analysis of in-house protocol and conventional 5-step protocol samples.
MS source parameters

| | |
|---|---|
| Capillary Voltage (V) | 3500 |
| Gas Temp. (° C.) | 350 |
| Gas Flow (L/min) | 8 |
| Nebulizer (psi) | 45 |
| Sheath Gas Heater | 350 |
| Sheath Gas Flow | 12 |
| Cell Accelerator (V) | 7 |
| Polarity | Positive and Negative (2 separate analyses) |
| ΔEMV | 200 |

TABLE 10

Compound Parameters for positive mode analysis of in-house protocol and conventional 5-step protocol samples.

| Analyte | Precursor (m/z) | Product (m/z) | Fragmentor (V) | Collision Energy (V) | $t_r$ (min) | Retention Window (min) |
|---|---|---|---|---|---|---|
| 5-(N,N-dimethyl) Amiloride | 259 | 199.9 | 100 | 15 | 5.32 | 1.5 |
| Abacavir | 287 | 191 | 135 | 20 | 4.04 | 1.5 |
| Amiloride | 230.1 | 170.9 | 100 | 17 | 3.15 | 1.5 |
| Amitriptyline | 278.19 | 91 | 110 | 25 | 7.15 | 1.5 |
| Amitriptyline-$d_3$ | 281.44 | 91 | 100 | 25 | 7.15 | 1.5 |
| Atrazine | 216.1 | 173.9 | 115 | 17 | 7.79 | 1.5 |
| Atrazine-$d_5$ | 222 | 179.7 | 115 | 20 | 7.74 | 1.5 |
| Benzoylecgonine | 290.14 | 168 | 115 | 17 | 3.87 | 1.5 |
| Benzoylecgonine-$d_3$ | 293.31 | 171 | 120 | 16 | 3.86 | 1.5 |
| Buspirone | 386.21 | 122 | 165 | 33 | 5.58 | 1.5 |
| Buspirone-$d_8$ | 394.21 | 121.9 | 185 | 36 | 5.56 | 1.5 |
| Clarithromycin | 748.51 | 158 | 165 | 29 | 7.50 | 3 |
| Haloperidol | 376.15 | 122.9 | 130 | 45 | 6.96 | 1.5 |
| Haloperidol-$d_4$ | 380.9 | 126.9 | 120 | 45 | 6.94 | 1.5 |
| Hydroquinidine | 327.21 | 55.1 | 150 | 45 | 5.59 | 1.5 |
| Imidacloprid | 256.06 | 209 | 95 | 9 | 4.83 | 1.5 |
| Imidacloprid-$d_4$ | 260.7 | 131.4 | 100 | 33 | 5.32 | 1.5 |
| Imipramine | 281.2 | 86.1 | 105 | 13 | 6.93 | 1.5 |
| Imipramine-$d_3$ | 284.2 | 193 | 100 | 40 | 6.93 | 1.5 |
| Imiquimod | 241.1 | 168.1 | 150 | 40 | 6.40 | 1.5 |
| Loratadine | 383.11 | 337 | 150 | 21 | 10.92 | 1.5 |
| Loratadine-$d_5$ | 388 | 337 | 150 | 25 | 10.95 | 1.5 |
| MCPP-$d_8$ | 206 | 159 | 135 | 20 | 4.47 | 1.5 |
| Mesoridazine | 387.2 | 98.1 | 150 | 40 | 6.16 | 1.5 |
| Methapyrilene | 262.1 | 97 | 150 | 40 | 5.30 | 1.5 |
| Methapyrilene-dimethyl-$d_6$ | 268 | 97 | 150 | 20 | 5.28 | 1.5 |
| Mianserin | 265.2 | 58.2 | 128 | 24 | 6.33 | 1.5 |
| Mianserin-$d_3$ | 268.4 | 61.2 | 130 | 25 | 6.31 | 1.5 |
| Mirtazapine | 266.2 | 72.2 | 128 | 16 | 4.98 | 1.5 |
| N-desmethyl-mirtazapine | 252.34 | 195 | 115 | 21 | 4.90 | 1.5 |
| Nefazodone | 470.2 | 246.1 | 150 | 20 | 7.91 | 1.5 |
| Nevirapine | 267.1 | 80 | 150 | 40 | 5.57 | 1.5 |
| Nizatidine | 332.1 | 58.1 | 150 | 40 | 1.50 | 1.5 |
| Quinine | 325.42 | 79 | 145 | 45 | 5.28 | 1.5 |

TABLE 11

Compound Parameters for negative mode analysis of in-house protocol and conventional 5-step protocol samples.

| Analyte | Precursor (m/z) | Product (m/z) | Fragmentor (V) | Collision Energy (V) | Retention Time (min) |
|---|---|---|---|---|---|
| Losartan | 421 | 127 | 150 | 40 | 7.89 |

Analysis of 3-step protocol samples. Samples were analyzed using an Agilent 1290 Infinity UHPLC coupled with an Agilent 6460 triple quadrupole mass spectrometer. Table 12 and Table 13 display the specific UHPLC and MS source parameters. Table 14 displays the compound specific MS parameters.

TABLE 12

UHPLC instrument parameters used for analysis of in-house protocol and conventional 3-step protocol samples.
UHPLC Source Parameters

| | |
|---|---|
| Column | Titan ™ C18; 5 cm × 2.1 mm; 1.9 μm (Sigma-Aldrich) |
| Column Temp. (° C.) | 40 |
| Mobile Phase A | 0.1% formic acid |
| Mobile Phase B | 0.1% formic acid in acetonitrile |
| Flow rate (mL/min) | 0.5 |
| Injection Volume (μL) | 2.00 |

| Gradient | Time (min) | % A | % B |
|---|---|---|---|
| | 0.30 | 70.0 | 30.0 |
| | 1.00 | 70.0 | 30.0 |
| | 4.00 | 70.0 | 30.0 |
| | 6.00 | 50.0 | 50.0 |
| | 6.10 | 50.0 | 50.0 |
| | 6.50 | 70.0 | 30.0 |
| | 8.50 | 70.0 | 30.0 |

TABLE 13

MS source parameters used for analysis of in-house protocol and Protocol P protocol samples.
MS source parameters

| | |
|---|---|
| Capillary Voltage (V) | 3500 |
| Gas Temp. (° C.) | 300 |
| Gas Flow (L/min) | 10 |
| Nebulizer (psi) | 20 |
| Sheath Gas Heater | 400 |
| Sheath Gas Flow | 12 |
| Cell Accelerator (V) | 7 |
| Polarity | Positive |
| ΔEMV | 200 |
| Dwell | 30 |

TABLE 14

Compound Parameters for positive mode analysis of in-house protocol and conventional 3-step protocol samples.

| Analyte | Precursor (m/z) | Product (m/z) | Fragmentor (V) | Collision Energy (V) |
|---|---|---|---|---|
| Betamethasone | 393.01 | 373.1 | 100 | 1 |
| Prednisolone | 361.01 | 147 | 95 | 25 |
| Alprazolam-$d_5$ | 314.01 | 286 | 170 | 25 |
| Alprazolam | 309.01 | 281 | 160 | 25 |
| Oxazepam | 288.01 | 241.9 | 115 | 17 |
| Abacavir | 287.01 | 191 | 110 | 17 |
| Amitriptyline-$d_3$ | 281.01 | 105 | 110 | 21 |
| Amitriptyline | 278.2 | 58.2 | 113 | 24 |
| Azidothymidine | 268.01 | 126.9 | 110 | 9 |
| Protriptyline-$d_3$ | 267.01 | 155 | 123 | 24 |
| Propranolol-$d_7$ | 267.01 | 56.2 | 120 | 28 |
| Protriptyline | 264.2 | 155.1 | 123 | 24 |
| Propranolol | 260.2 | 116 | 125 | 16 |
| Ketoprofen | 255.29 | 104.9 | 115 | 24 |
| Naproxen | 231.31 | 185 | 80 | 8 |
| Phenacetin | 180.1 | 65 | 125 | 44 |

Phospholipid monitoring. Samples were analyzed using an Agilent 1290 Infinity UHPLC coupled with an Agilent 6460 triple quadrupole mass spectrometer. Table 15 and Table 16 display the specific UHPLC and MS source parameters. Table 17 displays the compound specific MS parameters.

TABLE 15

UHPLC instrument parameters used for phospholipid monitoring.
UHPLC instrument parameters

| | |
|---|---|
| Column | Ascentis ® Express C18; 5 cm × 2.1 mm; 2.7 μm (Sigma-Aldrich) |
| Column Temp. (° C.) | 40 |
| Mobile Phase | 5 mM ammonium formate in 90:10 (MeOH/water) |
| Flow rate (mL/min) | 0.5 |
| Injection Volume (μL) | 2.00 |

TABLE 16

MS source parameters used for phospholipid monitoring.
MS source parameters

| | |
|---|---|
| Capillary Voltage (V) | 5000 |
| Gas Temp. (° C.) | 350 |
| Gas Flow (L/min) | 8 |
| Nebulizer (psi) | 45 |
| Sheath Gas Heater | 350 |
| Sheath Gas Flow | 12 |
| Cell Accelerator (V) | 7 |
| Polarity | Positive |

TABLE 17

Compound Parameters for phospholipid monitoring.

| Analyte | Precursor (m/z) | Product (m/z) | Fragmentor (V) | Collision Energy (V) |
|---|---|---|---|---|
| Phospholipid 1 | 184 | 104 | 160 | 80 |
| Phospholipid 2 | 496 | 184 | 160 | 80 |
| Phospholipid 3 | 524 | 184 | 160 | 80 |
| Phospholipid 4 | 704 | 184 | 160 | 80 |
| Phospholipid 5 | 758 | 184 | 160 | 80 |
| Phospholipid 6 | 786 | 184 | 160 | 80 |
| Phospholipid 7 | 806 | 184 | 160 | 80 |

Preliminary Studies. The focus of preliminary studies was to screen a series of co-polymer resins for recovery of a six analyte mix out of buffer. The analytes of interest were selected due to their variety of hydrophobic character (Table 18). Although a simple screen, the results were useful in identifying potential resins to evaluate further.

TABLE 18

Analytes of interest utilized for the preliminary screen.

| Analyte | Log P |
|---|---|
| Acetaminophen | 0.5 |
| Procainamide | 0.9 |
| p-Toluamide | 1.2 |
| 2,7-dihydroxynaphthalene | 2.3 |
| Propranolol | 3.0 |
| Doxepin | 4.3 |

A total of eight co-polymer resins were prepared for preliminary screening. These resins were designed to study the role of copolymer ratios and pore structure on analyte recovery. Table 19 describes the co-polymer composition of each experimental resin. The o-xylene:MIBC (w:w) ratio was varied in several resins in order to vary the pore structure.

TABLE 19

Co-polymer composition of preliminarily screened experimental resins.

| Resin ID | DVB (%) | AcrylN (%) | VP (%) | o-xylene:MIBC (w:w) |
|---|---|---|---|---|
| HLB-96 | 91.5 | 8.5 | 0 | |
| HLB-98 | 90.9 | 9.1 | 0 | |
| HLB-99 | 90.9 | 0 | 9.1 | |
| HLB-100 | 63 | 0 | 37 | 150:150 |
| HLB-01 | 63 | 37 | 0 | 150:150 |
| HLB-03 | 63 | 37 | 0 | 225:75 |
| HLB-05 | 63 | 0 | 37 | 225:75 |
| HLB-10 | 25 | 75 | 0 | 150:150 |

DVB: divinyl benzene; AcrylN: acrylonitrile; VP: N-vinylpyrrolidone; MIBC: methyl isobutyl carbinol.

Several experimental resins were further analyzed to better understand their chemistries. These resins were evaluated for CHN composition (Table 20) and surface area and porosity (Table 21). Conventional HLB A, Conventional HLB B, and Conventional HLB C materials were also evaluated for comparison.

TABLE 20

CHN composition of conventional products and several experimental resins.

| Resin ID | N (%) | C (%) | H (%) | Total (%) |
|---|---|---|---|---|
| Conventional HLB A | 0.70 | 35.47 | 3.72 | 39.89 |
| Conventional HLB B | 2.35 | 86.14 | 8.27 | 96.76 |
| Conventional HLB C | 2.42 | 85.61 | 8.10 | 96.13 |
| HLB-96 | 2.00 | 87.56 | 7.84 | 97.40 |
| HLB-98 | 1.88 | 89.37 | 7.89 | 99.14 |
| HLB-99 | ≤0.02 | 90.01 | 8.02 | 98.03 |
| HLB-100 | 1.05 | 88.10 | 8.13 | 97.28 |
| HLB-01 | 9.22 | 82.75 | 7.35 | 99.32 |
| HLB-03 | 8.82 | 82.75 | 7.37 | 98.94 |
| HLB-05 | 0.97 | 87.49 | 7.92 | 96.38 |
| Comparative Sample | ≤0.02 | 90.84 | 7.92 | 98.76 |

In terms of CHN composition it became apparent that Conventional HLB B and Conventional HLB C materials are very similar. However Conventional HLB A material greatly differs, with only 35.47% carbon.

TABLE 21

Co-polymer surface area and porosity of conventional HLB products and several experimental HLB resins.

| Resin ID | Diameter (μm) | Surface area (m²/g) | Single point total pore volume (mL/g) | Average pore diameter (Å) |
|---|---|---|---|---|
| Conventional HLB A | | 438 | 1.04 | 95 |
| Conventional HLB B | | 716 | 1.29 | 72 |
| Conventional HLB C | | 201 | 0.958 | 190 |
| HLB-96 | 38-75 | 423 | 1.02 | 97 |
| HLB-99 | 38-75 | 448 | 1.17 | 105 |

TABLE 21-continued

Co-polymer surface area and porosity of conventional HLB products and several experimental HLB resins.

| Resin ID | Diameter (μm) | Surface area (m²/g) | Single point total pore volume (mL/g) | Average pore diameter (Å) |
|---|---|---|---|---|
| HLB-100 | 38-75 | 667 | 1.21 | 73 |
| HLB-01 | 38-75 | 346 | 0.74 | 85 |
| HLB-03 | 38-75 | 401 | 0.67 | 66 |
| HLB-05 | 38-75 | 658 | 0.82 | 50 |

In terms of surface area and porosity, Conventional HLB A and Conventional HLB B also differ. Conventional HLB B has a greater surface area and a smaller pore diameter than the Conventional HLB A material.

Figure 6:
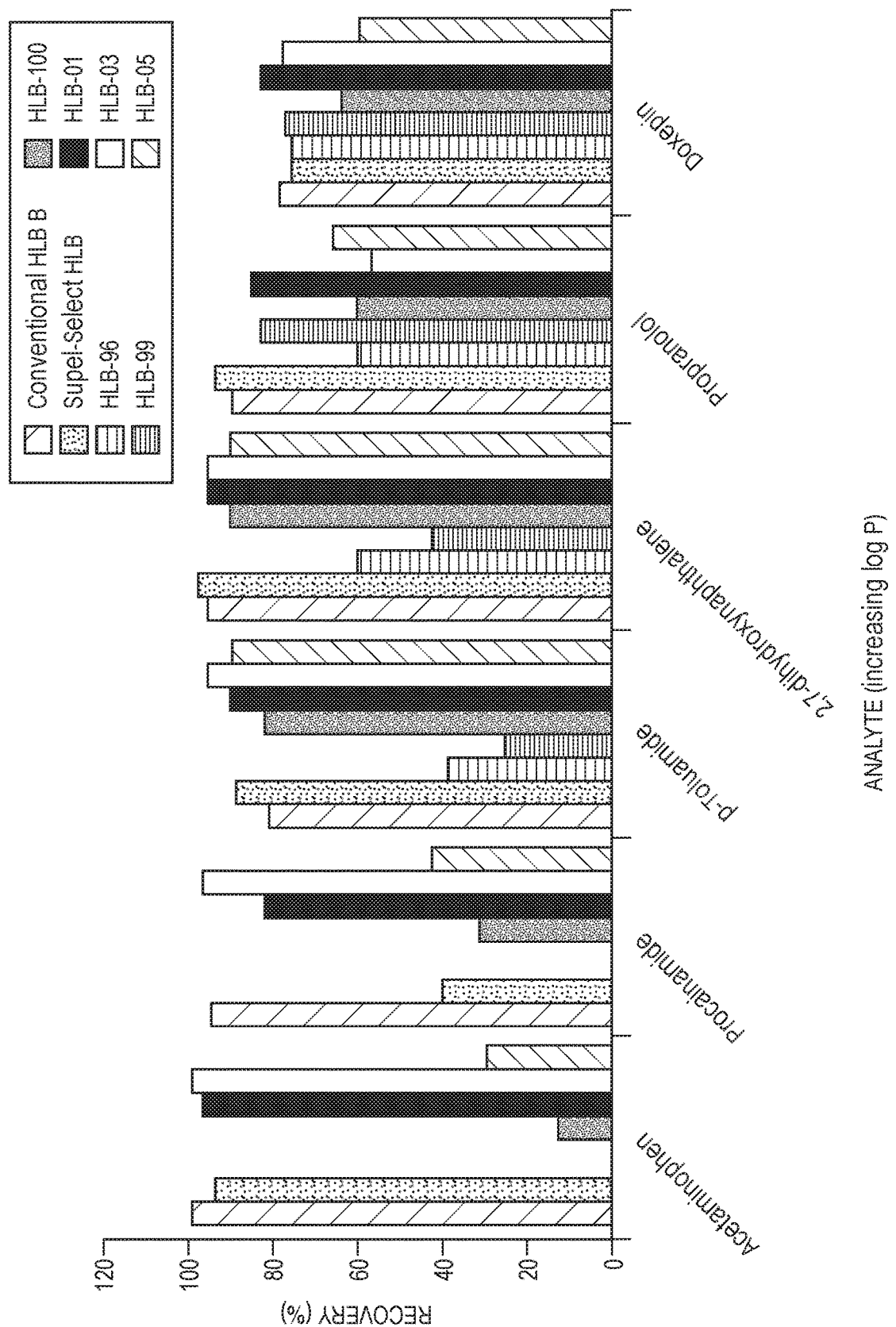
FIG. 6 compares the recoveries of components of a six-analyte mix using six experimental HLB adsorbents and two conventional HLB adsorbents. A traditional 5-step protocol that incorporated a dry step following conditioning and equilibration was used.

Each experimental resin was evaluated for the ability to recover the six analytes of interest following two protocols. The first protocol was modeled after a conventional HLB method, however the bed was dried following conditioning and equilibration. The results of this experiment can be found in FIG. 6. As expected, the Conventional HLB B product resulted in high recoveries for all 6 analytes, with the lowest recovery of 79% for the most lipophilic analyte, doxepin. Screening of the experimental resins revealed great differences. The highest performing resin at this stage was determined to be HLB-01. Recoveries were greater than 80% for all six analytes.

Figure 7:
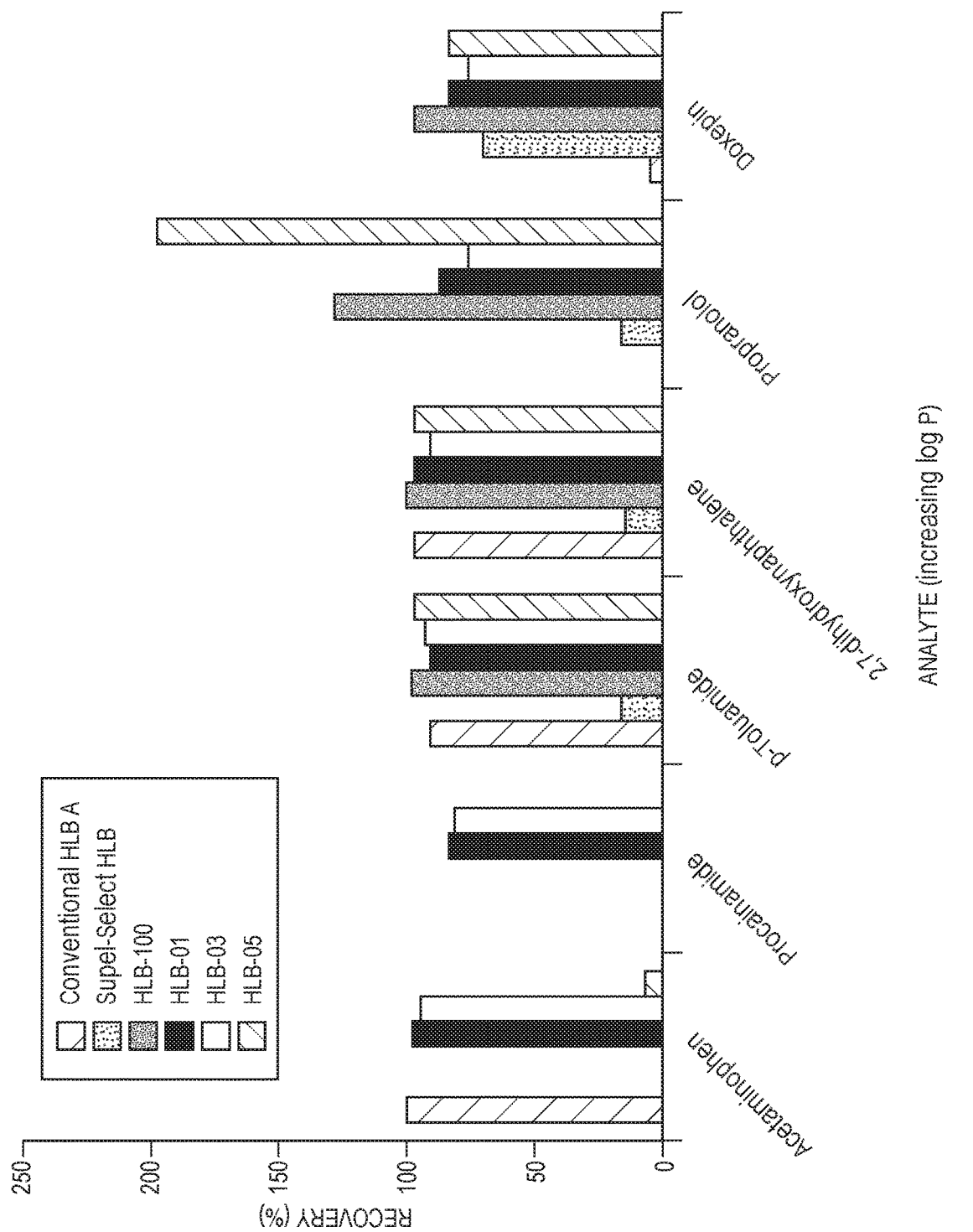
FIG. 7 compares the recoveries of components of a six-analyte mix using four experimental HLB adsorbents and two conventional HLB adsorbents. A 3-step protocol was used; no conditioning or equilibration was performed.

The second protocol utilized a 3-step process: loading, washing, and elution. At the time of these experiments, the 3-step protocol was unknown, so extractions were performed at neutral pH. The results of this experiment can be found in FIG. 7. Surprisingly, only 3 out of the 6 analytes were recovered using the Conventional HLB A product. These results may reveal a weakness with the product, or may simply be due to these initial extractions being performed at neutral pH. The best performing experimental resin was again found to be HLB-01, with greater than 80% recoveries and RSDs typically 5% for all 6 analytes.

The preliminary screening revealed that the next level of experimentation should center around resin HLB-01. This resin was prepared starting with a monomer ratio of 63:37 (DVB/AN) and a phase extender ratio of 150:150 (o-xylene/MIBC). This resin performed better than HLB-03, which only differed by the phase extender ratio, resulting in less macroporosity; and HLB-100, which differed in the hydrophilic monomer (substituting N-vinylpyrrolidone for acrylonitrile).

Extended Screening. 20 additional analytes were chosen in order to perform an extended screening to further optimize the experimental HLB resin. Table 22 displays all 20 analytes and their log P values. This mix represents a wider range of hydrophobic character. This variety should aid in finding an even more ideal HLB resin.

TABLE 22

20-analyte mix utilized for extended screening of experimental resins

| Analyte | Log P |
|---|---|
| Amiloride | −0.30 |
| Imidacloprid | 0.57 |
| Nizatidine | 1.10 |
| Benzoylecgonine | 1.71 |
| Nevirapine | 2.50 |
| Atrazine | 2.61 |
| Buspirone | 2.63 |
| Imiquimod | 2.70 |
| Methapyrilene | 2.87 |
| Mirtazapine | 2.90 |
| Clarithromycin | 3.16 |
| Mianserin | 3.52 |
| Hydroquinidine | 3.77 |
| Mesoridazine | 3.90 |
| Haloperidol | 4.30 |
| Nefazodone | 4.70 |
| Imipramine | 4.80 |
| Amitriptyline | 5.10 |
| Loratadine | 5.20 |
| Losartan | 6.10 |

During preliminary screening, large changes were made in the polymer chemistry in order to identify conditions of interest. In order to further optimize the HLB resin, small changes were made to the chemistry during extended screening. This will allow for a "fine tuning" of the polymer chemistry. Table 23 contains the co-polymer compositions and the porosity characteristics of the additional resins: HLB-22 and HLB-26, compared with HLB-01.

TABLE 23

Co-polymer compositions and porosity characteristics of additional experimental resins.

| Resin ID | DVB (%) | AcrylN (%) | o-xylene:MIBC (w:w) | % micropores (surface area) (m²/g) | % micropores (volume) (cc/g) |
|---|---|---|---|---|---|
| HLB-01 | 63 | 37 | 150:150 | 16.8 | 13.5 |
| HLB-22 | 75 | 25 | 150:150 | 28.7 | 17.6 |
| HLB-26 | 75 | 25 | 50:150 | 33.6 | 26.4 |

FIG. 8 and Table 24 compare the recoveries of 20 analytes extracted out of spiked serum under acidic conditions for the three experimental co-polymeric resins. In this analysis, resin HLB-22 was found to have improved performance over resins HLB-01 and HLB-26. This resin has a starting monomer ratio of 75:25 (divinylbenzene/acrylonitrile).

TABLE 24

Number of analytes within each absolute recovery category for three experimental resins.
Number of Analytes

| Recovery (%) | HLB-01 | HLB-22 | HLB-26 |
|---|---|---|---|
| >70% | 12 | 16 | 12 |
| 50-70% | 7 | 2 | 6 |
| <50% | 1 | 2 | 2 |

Figure 9A:
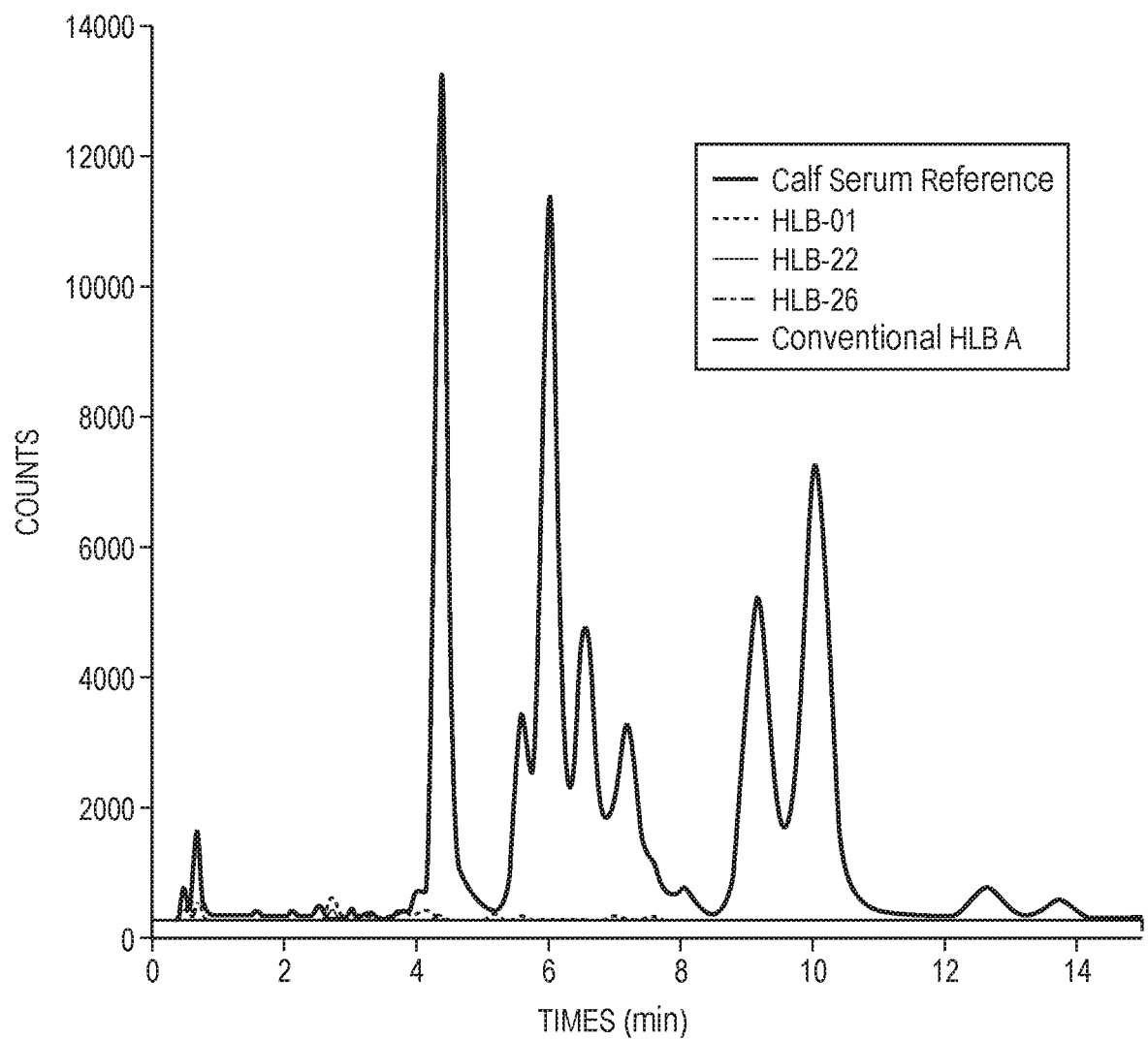
FIG. 9A shows serum removal data of unextracted calf serum using experimental resins HLB-01, HLB-22, HLB-26, and Conventional HLB A.
Figure 9B:
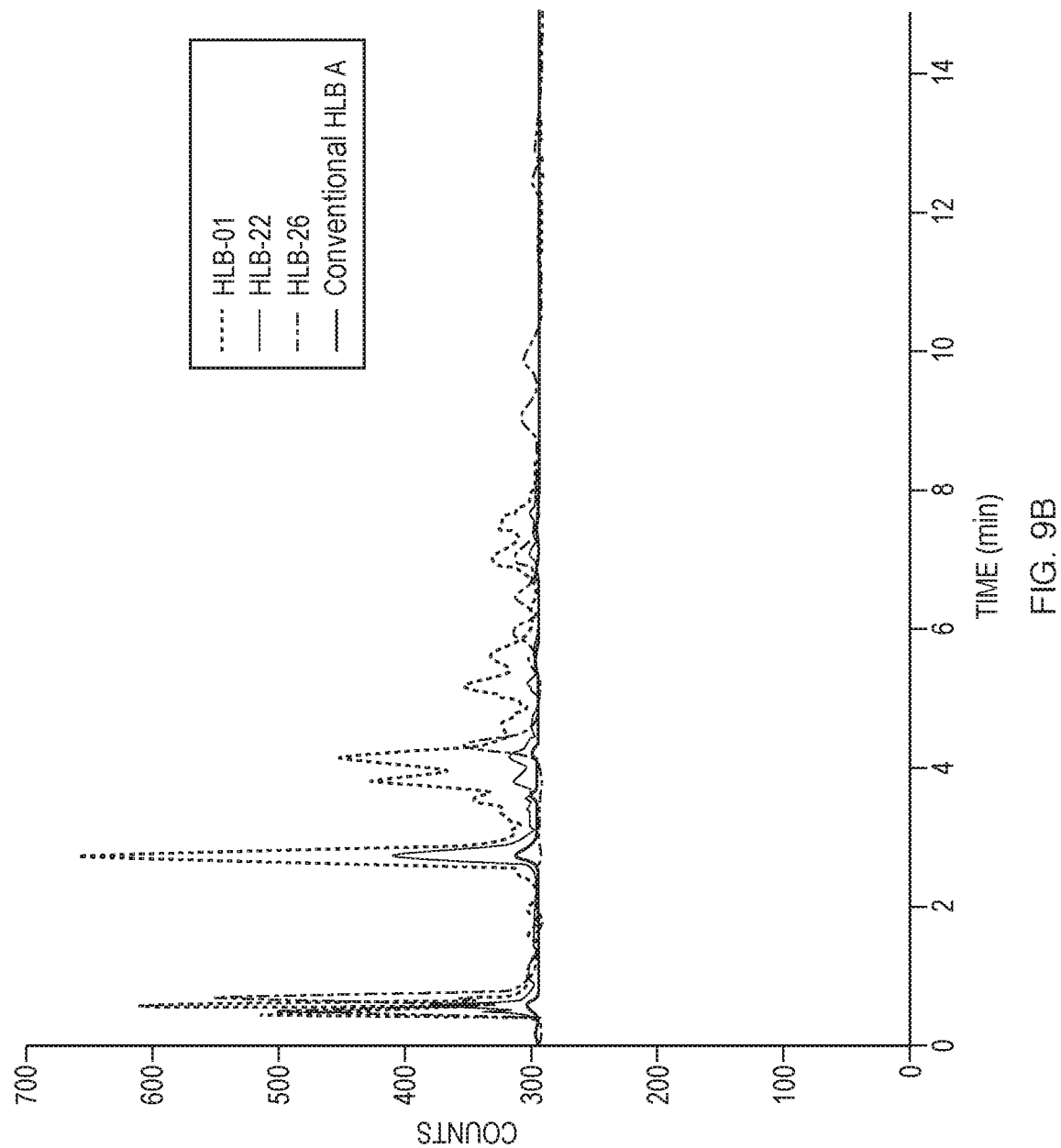
FIG. 9B shows the same with an expanded y-axis.

Each experimental resin was also evaluated for the ability to remove phospholipids from matrix samples. FIG. 9 displays an overlay of MRM traces of unextracted calf serum with samples that had been extracted with various experimental resins and Conventional HLB A. All experimental resins were capable of removing >95% of phospholipids present. HLB-22 was found to result in 98.7% removal when acidic extraction conditions were utilized.

Next, a polymer coated silica was also investigated. A material was prepared that was successful in >99% phospholipid removal. After identifying the optimal polymer conditions, the next stage was to compare the performance of this experimental polymer against two conventional products: Conventional HLB A and Conventional HLB B.

Figure 10:
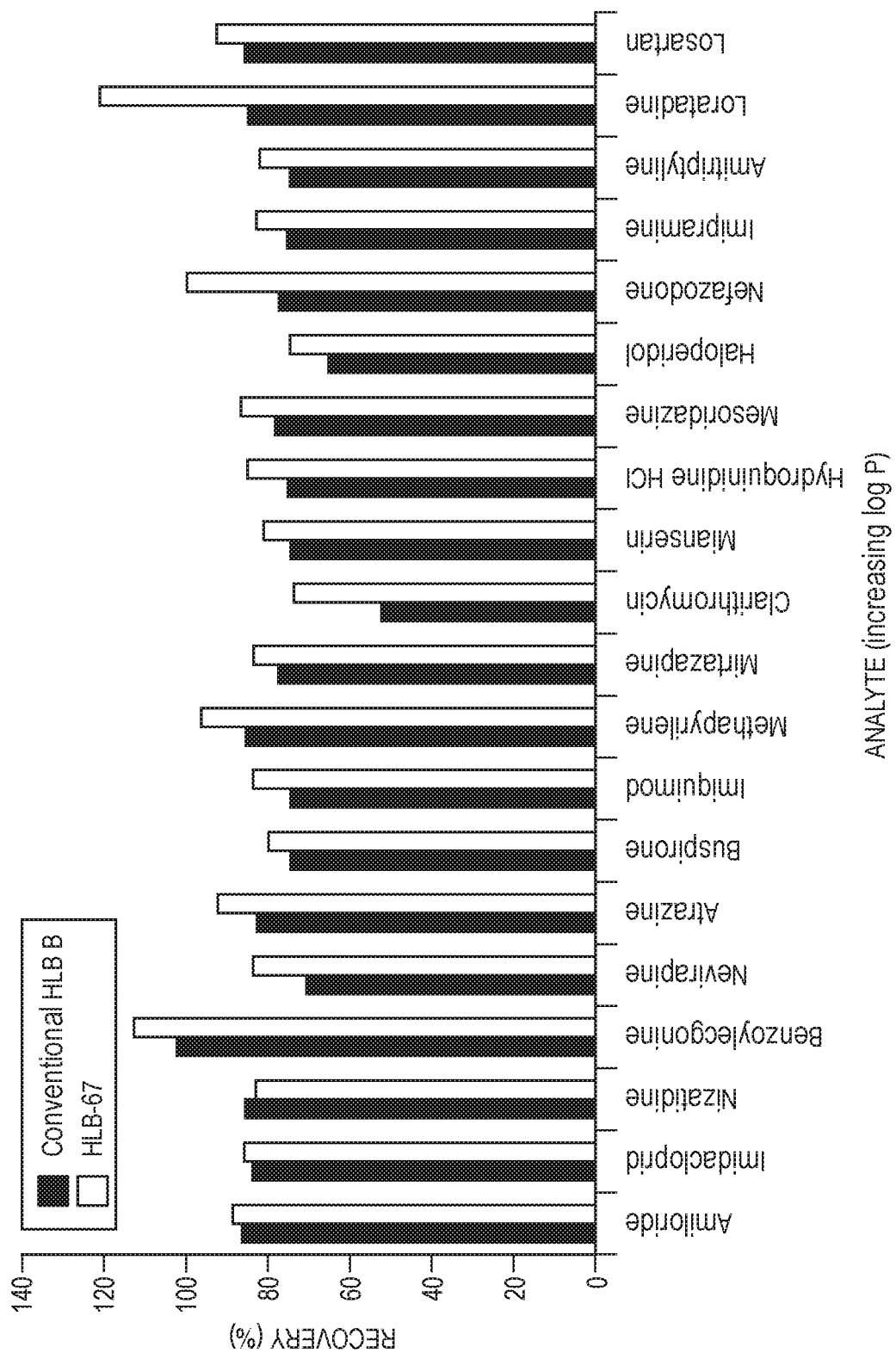
FIG. 10 shows a comparison of absolute analyte recoveries from spiked matrix samples extracted using a standard 5-step protocol with experimental HLB-67 and Conventional HLB B.

The first comparison was performed using the 5-step protocol with the 20-analyte mixture detailed in Table 22. FIG. 10 compares absolute analyte recoveries across the 20 analytes using experimental polymer HLB-67 and Conventional HLB B. When using the same extraction methodologies, experimental copolymer HLB-67 was able to extract all 20 analytes with recoveries >70%. For Conventional HLB B, 18/20 analytes had high absolute recoveries. This result confirms that the materials described herein have the potential to be used as a direct replacement for existing conventional 5-step methods.

Figure 11:
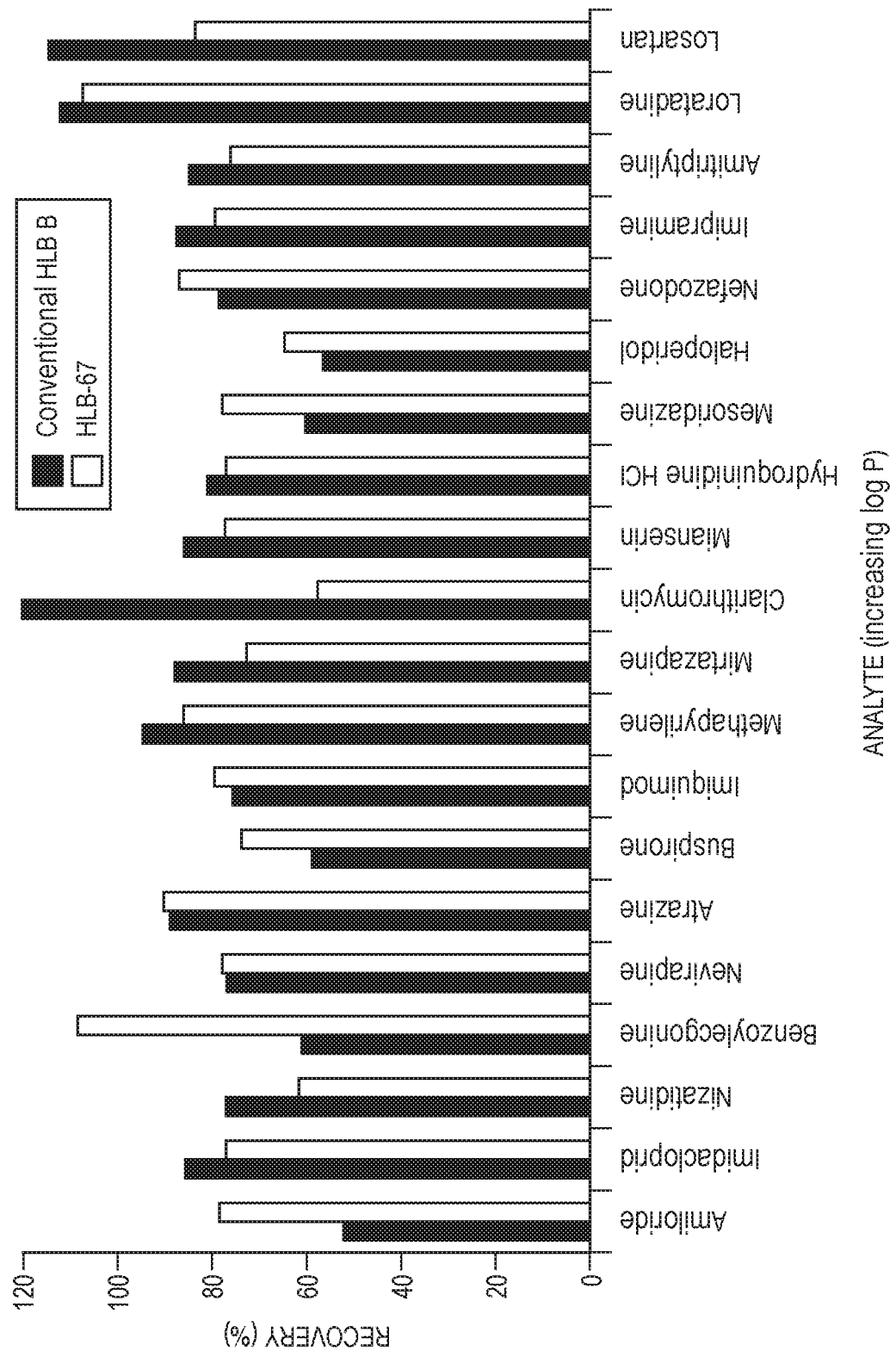
FIG. 11 shows a comparison of absolute analyte recoveries from spiked matrix samples extracted using a simplified 3-step protocol with experimental HLB-67 and Conventional HLB B.

Next, the potential of experimental resin HLB-67 to outperform Conventional HLB B was evaluated. This involved again extracting the 20-analyte mix from spiked serum under acidic conditions, however during this evaluation a simplified 3-step protocol was used. No conditioning or equilibration steps were included. The results of this evaluation can be seen in FIG. 11. Only 14/20 analytes were found to have absolute recoveries >70% when Conventional HLB B was used with a 3-step method. For our experimental resin HLB-67, 17/20 analytes had >70% recovery when a sample was loaded onto a dry bed. This suggests that the experimental resin has an advantage over the conventional product. Since the conditioning and equilibration steps are not required, a user can save time and steps using the 3-step, rather than 5-step, method.

Experimental HLB resin HLB-67 was then tested against Conventional HLB A. For this, an eight-analyte mix was chosen. Table 25 lists the eight analytes and their log P values.

TABLE 25

Analytes used for the 3-step protocol evaluations.

| Analyte | Log P |
| --- | --- |
| Azidothymidine (AZT) | 0.05 |
| Phenacetin | 1.58 |
| Betamethasone | 1.94 |
| Alprazolam | 2.12 |
| Naproxen | 3.18 |
| Propranolol | 3.48 |
| Protriptyline | 4.70 |
| Amitriptyline | 4.92 |

Figure 12:
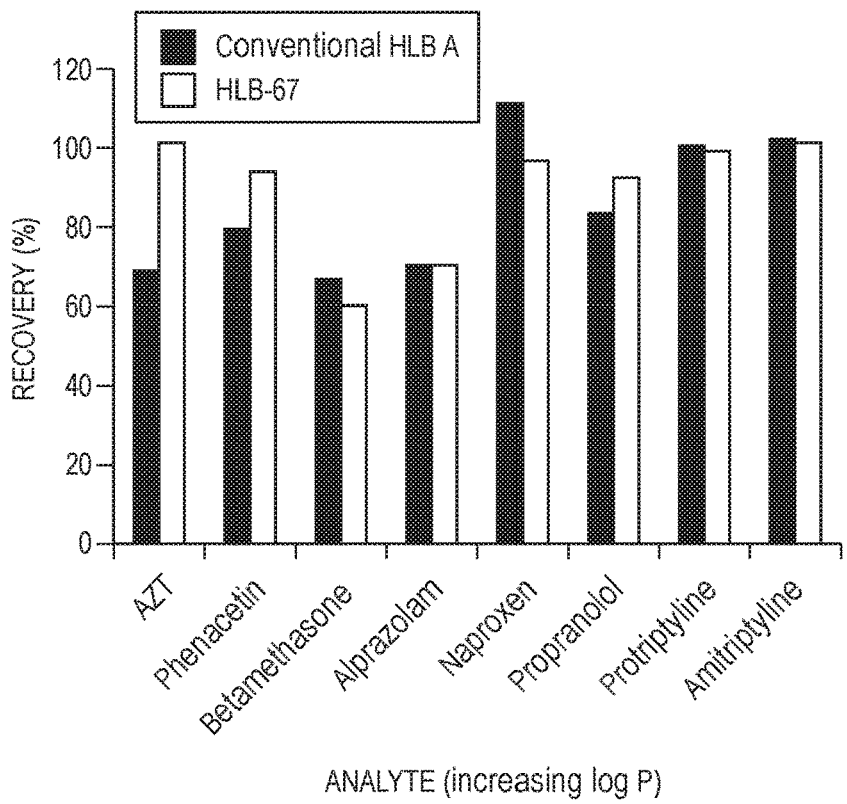
FIG. 12 is a comparison of absolute recoveries from spiked matrix samples extracted using a 3-step protocol with experimental HLB-67 and Conventional HLB A.

The experimental HLB copolymeric resin HLB-67 was found to perform almost identically to Conventional HLB A (FIG. 12). These results also demonstrate that the HLB material described herein is suitable for 3-step SPE methods.

The next comparison that was made with conventional HLB products was matrix removal. This was accomplished by monitoring seven different MRM transitions that represent different classes of phospholipids. Total peak areas were compared between extracted samples and unextracted serum to determine the average percentage of phospholipid removal. Table 26 compares matrix removal between an experimental resin, Conventional HLB A and Conventional HLB B. The experimental material was shown to remove a comparable amount of phospholipids from the sample as the conventional materials.

TABLE 26

Comparison of phospholipid removal accomplished using an experimental resin and two conventional resins.

| Resin Used | Average % Phospholipid Removal |
| --- | --- |
| Experimental HLB | 98.8 |
| Conventional HLB A | 98.9 |
| Conventional HLB B | 98.7 |

After establishing that the experimental copolymeric resins described herein are suitable as both a direct replacement and improvement over various conventional products, the final stage of evaluation was focused on determining the reproducibility of material preparation. A total of five small scale lots were prepared: 3 research-scale lots (HLB-22, HLB-67, and HLB-79) and 2 manufacturing lots. Each material was evaluated using the 20-analyte protocol outlined above: a 3-step method using 50:50 (ACN/MeOH) as the elution solvent. Table 27, Table 28 and Table 29 display the absolute, matrix matched, and relative recoveries of each material, respectively.

TABLE 27

Comparison of absolute recoveries out of spiked serum across different lots of experimental resin.
Number of Anaytes (Absolute Recoveries)

| Recovery (%) | R&D Lot 1 HLB-22 | R&D Lot 2 HLB-67 | R&D Lot 3 HLB-79 | Manuf. Lot 1 | Manuf. Lot 2 | Conventional HLB A (reference) |
| --- | --- | --- | --- | --- | --- | --- |
| >70% | 17 | 18 | 18 | 17 | 19 | 17 |
| 50-70% | 3 | 2 | 2 | 3 | 1 | 3 |
| <50% | 0 | 0 | 0 | 0 | 0 | 0 |

TABLE 28

Comparison of matrix matched recoveries out of spiked serum across different lots of experimental resin.
Number of Analytes (Matrix Matched Recoveries)

| Recovery (%) | R&D Lot 1 HLB-22 | R&D Lot 2 HLB-67 | R&D Lot 3 HLB-79 | Manuf. Lot 1 | Manuf. Lot 2 | Conventional HLB A (reference) |
| --- | --- | --- | --- | --- | --- | --- |
| >70% | 18 | 18 | 19 | 20 | 20 | 18 |
| 50-70% | 2 | 2 | 1 | 0 | 0 | 2 |
| <50% | 0 | 0 | 0 | 0 | 0 | 0 |

TABLE 29

Comparison of relative recoveries out of spiked serum across different lots of experimental resin.
Number of Analytes (Relative Recoveries)

| Recovery (%) | R&D Lot 1 HLB-22 | R&D Lot 2 HLB-67 | R&D Lot 3 HLB-79 | Manuf. Lot 1 | Manuf. Lot 2 |
| --- | --- | --- | --- | --- | --- |
| >120% | 1 | 0 | 0 | 0 | 0 |
| 80-120% | 13 | 15 | 15 | 15 | 15 |
| <80% | 2 | 1 | 1 | 1 | 1 |

Additional Experiments

Experimental HLB copolymer HLB-01 was evaluated for possible overdrying effects by measuring absolute of a six-analyte mixture using the following procedure. A 1 mg/mL stock was prepared by solvating 50 mg of the following analytes in 50 mL of methanol: acetaminophen, procainamide, p-toluamide, 2,7 dihydroxynaphthalene, propranolol, and doxepin. A 10 µg/mL analytical stock was prepared by transferring 500 µL of 1 mg/mL stock into 49.5 mL of 20 mM potassium phosphate buffer. Reagents were prepared using volumetric flasks filled according to standard procedure. Three mL SPE cartridge formats with 60 mg bed weights were utilized. Samples were processed utilizing the protocol described in Table 30.

TABLE 30

Figure 13:
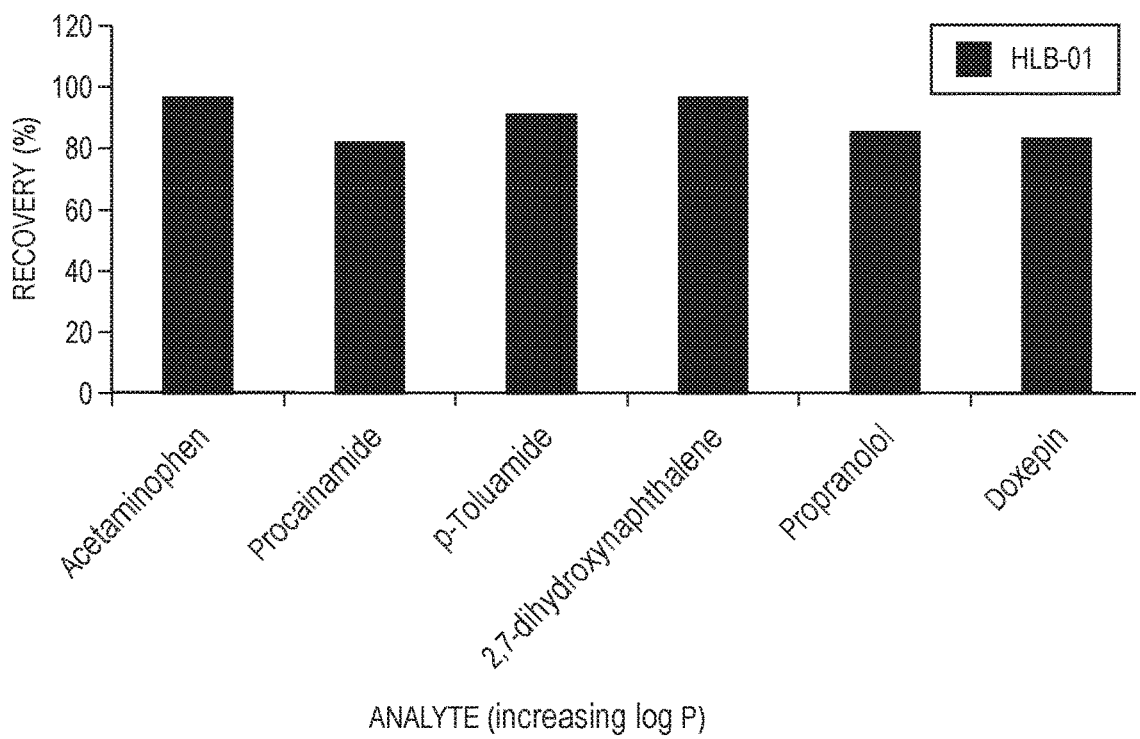
FIG. 13 shows the absolute recovery of six analytes using experimental HLB-01 to extract from a buffer solution.

5-step SPE protocol with dry step (used for FIG. 13 data).

5-step Protocol:
Conditioning: 1 mL of MeOH
Equilibration: 1 mL of 20 mM phosphate buffer
Dry: applied 10" Hg vacuum for 10 min
Load: 1 mL sample in 20 mM phosphate buffer
Wash: 1 mL 5% MeOH
Elute: 1 mL MeOH
Evaporate: 40° C., 10 psi nitrogen stream
Reconstitute: 1 mL 20 mM phosphate buffer Drop rates were maintained at 1 drop per second or less. Analyte stocks were initially dissolved in methanol at 1 mg/mL concentrations and were then diluted to 10 µg/mL in 20 mM potassium phosphate buffer (pH 7) to produce the loading stock. After evaporation all samples were vortexed 30 seconds in 20 mM potassium phosphate buffer (pH 7) to reconstitute for analysis. Three aliquots of 10 µg/mL loading solution were analyzed and the average area count for each compound was used as a reference to calculate recovery of the respective compounds.

HPLC parameters: Analysis was performed using an Agilent 1190 HPLC coupled with a UV detector. Method parameters can be found in Table 31.

TABLE 31

HPLC-UV parameters for analysis of 6 analyte screening.
HPLC-UV instrument parameters

| Column | Discovery C18, 5 cm × 4.6 mm × 5 µm |
|---|---|
| Mobile phase A | 20 mM potassium phosphate |
| Mobile phase B | MeOH |
| Injection volume | 25 µL |

| Gradient | Time (min) | A % | B % |
|---|---|---|---|
| | 0.0 | 95 | 5 |
| | 2.00 | 95 | 5 |
| | 3.00 | 65 | 35 |
| | 7.00 | 65 | 35 |
| | 8.00 | 30 | 70 |
| | 12.00 | 30 | 70 |
| | 12.10 | 95 | 5 |
| | 20.00 | 95 | 5 |
| Wavelength | 230 nm | | |
| Flow | 1.0 mL/min | | |

FIG. 13 shows the absolute recovery of six analytes using an acrylonitrile-containing HLB copolymer described herein (HLB-01) to extract from a buffer solution. The material was dried following pre-treatment, showing that the overdrying effect is not an issue when working with the new HLB material. These analytes represent a log P range of 0.5-4.3.

HLB copolymer HLB-01 was then evaluated against a conventional vinylpyrrolidone-containing HLB, Conventional HLB A, by measuring the recovery of the same six analytes but using the 3-step process. The same solution preparation and HPLC analysis was followed as described above. The SPE procedure was slightly altered as shown in Table 32.

TABLE 32

Figure 14:
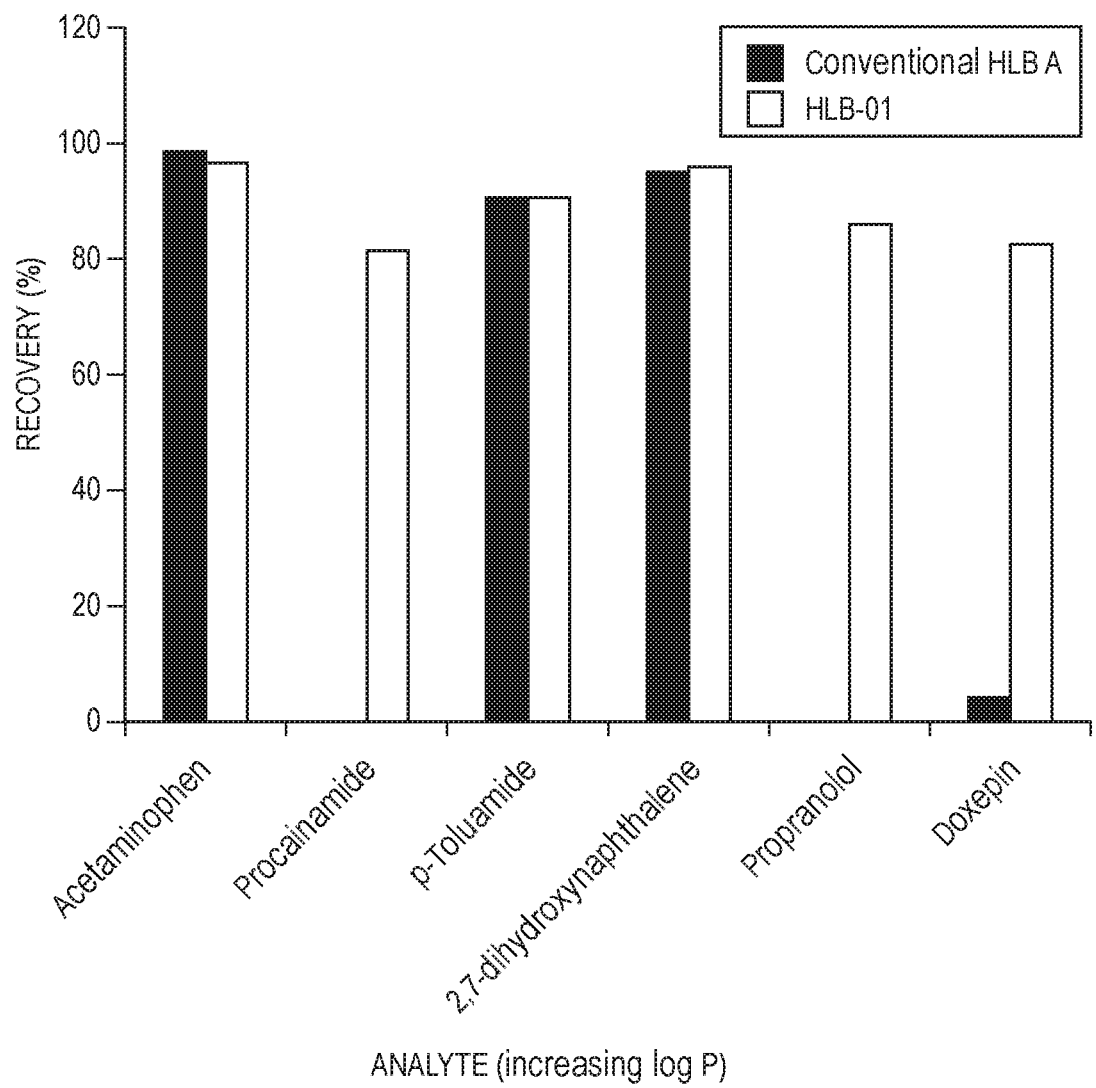
FIG. 14 shows a comparison of the absolute recovery of an acrylonitrile-containing HLB copolymer described herein, HLB-01, with Conventional HLB A—a vinylpyrrolidone-containing HLB material.

3-step SPE protocol for FIG. 14 data.

3-step Protocol:
Load: 1 mL sample in 20 mM phosphate buffer
Wash: 1 mL 5% MeOH
Elute: 1 mL 90:10 (ACN/MeOH)
Evaporate: 40° C., 10 psi nitrogen stream
Reconstitute: 1 mL 20 mM phosphate buffer FIG. 14 shows a comparison of the absolute recovery of acrylonitrile-containing HLB material (HLB-01) and a vinylpyrrolidone-containing conventional HLB material (Conventional HLB A) when a simplified 3-step protocol is utilized (no conditioning or equilibration prior to sample loading) to extract from spiked serum. This set of compounds in FIG. 14 represents a log P range of 0.5-4.3.

Experimental HLB copolymer HLB-65 was coated on silica particles as described above. The HLB-coated silica particles were used as follows. A 20-analyte mixture including the following: amiloride, amitriptyline, atrazine, benzoylecgonine, buspirone, clarithromycin, haloperidol, hydroquinidine, imidacloprid, imipramine, imiquimod, loratadine, mesoridazine, methapyrilene, mianserin, mirtazapine, nefazodone, nevirapine, nizatidine, and losartan was utilized. A 20 mM ammonium acetate buffer, pH 7.4, was spiked with analyte at a concentration of 200 ng/mL. The spiked sample was then diluted 1:1 with 20 mM ammonium acetate. These solutions were also spiked with an internal standard mixture, allowing for final concentrations of 100 ng/mL analyte and 50 ng/mL internal standards. The SPE procedure is described in Table 33.

TABLE 33

Figure 15:
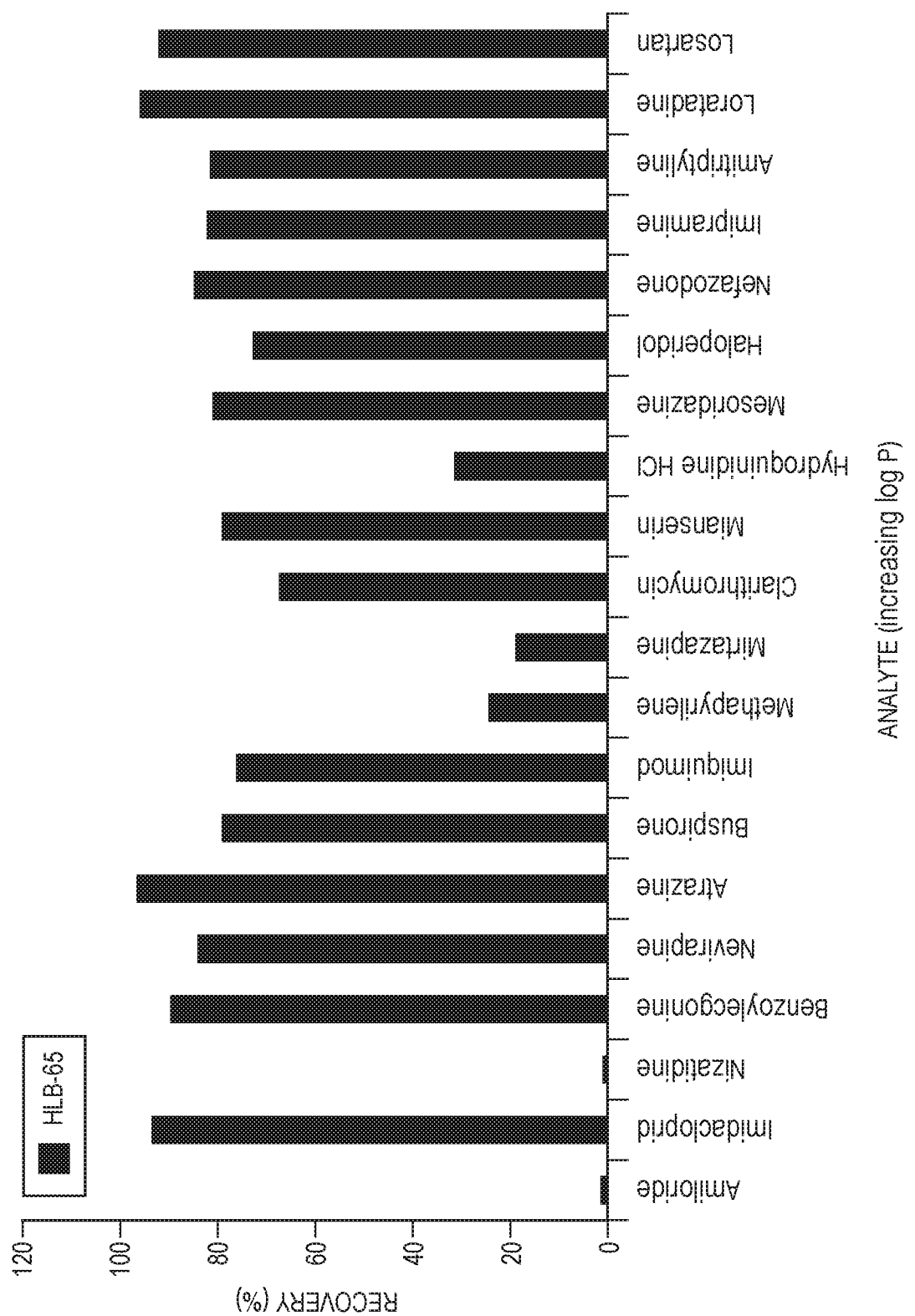
FIG. 15 shows the absolute recovery of a variety of analytes using silica coated with experimental adsorbent HLB-65.

SPE procedure used for evaluation of polymer
coated silica (used for FIG. 15 data).

SPE Procedure
Load 1 mL sample (diluted 1:1 with 20 mM ammonium acetate) onto a dry bed (60 mg bed weight).
Wash cartridge with 1 mL of 5% MeOH (aq.)
Elute with 1 mL of 50:50 (ACN/MeOH).
Evaporate samples to dryness at 40° C. with 10 psi nitrogen stream.
Reconstitute in 1 mL of starting mobile phase.

LC-MS/MS Analysis: Samples were analyzed using an Agilent 1290 Infinity UHPLC coupled with an Agilent 6460 triple quadrupole mass spectrometer. Table 34 and Table 35 show the specific UHPLC and MS source parameters. Table 36 and Table 37 display the compounds specific MS parameters for the analysis of analytes in positive and negative mode, respectively.

TABLE 34

Figure 16:
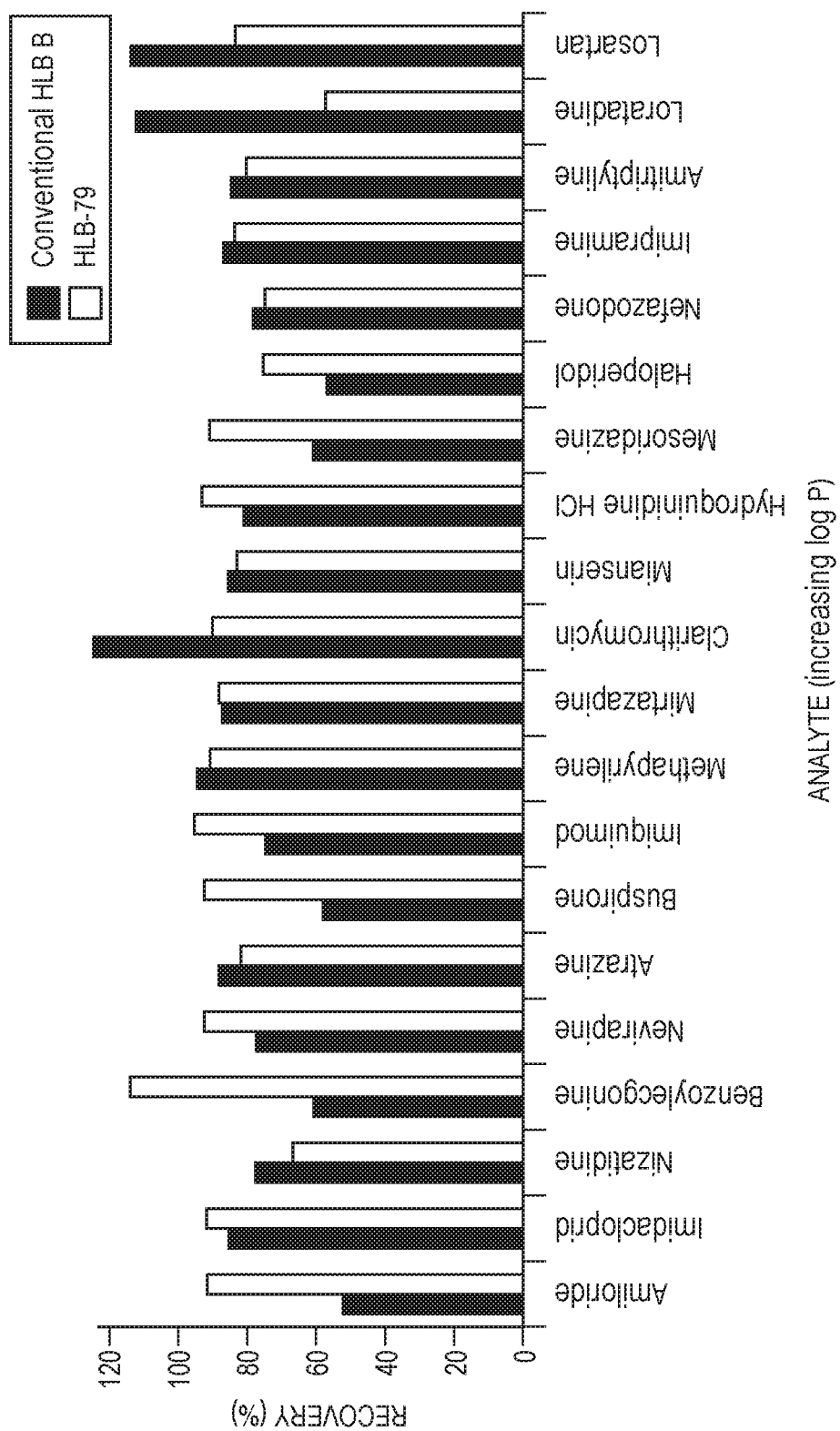
FIG. 16 shows a comparison of an HLB copolymer HLB-79 coated a silica substrate versus a conventional HLB adsorbent using a 3-step SPE protocol.

UHPLC instrument parameters used for analysis of the
20-analyte mix (used for FIGS. 15 and 16 data).
UHPLC Instrument parameters

| Column | Ascentis Express RP-Amide; 10 cm × 2.1 mm; 2.7 µm |
|---|---|
| Column Temp. (° C.) | 40 |
| Mobile Phase A | 0.1% acetic acid, 5 mM ammonium acetate |

TABLE 34-continued

UHPLC instrument parameters used for analysis of the
20-analyte mix (used for FIGS. 15 and 16 data).
UHPLC Instrument parameters

| | |
|---|---|
| Mobile Phase B | 5 mM ammonium acetate in acetonitrile |
| Flow rate (mL/min) | 0.4 |
| Injection Volume (µL) | 2.00 |

| Gradient | Time (min) | A % | B % |
|---|---|---|---|
| | 0.00 | 95.0 | 5.0 |
| | 1.00 | 95.0 | 5.0 |
| | 7.00 | 57.0 | 43.0 |
| | 8.00 | 57.0 | 43.0 |
| | 10.00 | 38.5 | 61.5 |
| | 11.00 | 95.0 | 5.0 |
| | 14.00 | 95.0 | 5.0 |

TABLE 35

MS source parameters used for analysis of the 20-analyte mix
(used for FIG. 15 and 16 data).
MS source parameters

| | |
|---|---|
| Capillary Voltage (V) | 3500 |
| Gas Temp. (° C.) | 350 |
| Gas Flow (L/min) | 8 |
| Nebulizer (psi) | 45 |
| Sheath Gas Heater | 350 |
| Sheath Gas Flow | 12 |
| Cell Accelerator (V) | 7 |
| Polarity | Positive and Negative (2 separate analyses) |
| ΔEMV | 200 |

TABLE 36

Compound Parameters for positive mode analysis of
the 20-analyte mix (used for FIG. 15 and 16 data).

| Analyte | Precursor (m/z) | Product (m/z) | Fragmentor (V) | Collision Energy (V) | $t_r$ (min) | Retention Window (min) |
|---|---|---|---|---|---|---|
| 5-(N,N-dimethyl) Amiloride | 259 | 199.9 | 100 | 15 | 5.32 | 1.5 |
| Abacavir | 287 | 191 | 135 | 20 | 4.04 | 1.5 |
| Amiloride | 230.1 | 170.9 | 100 | 17 | 3.15 | 1.5 |
| Amitriptyline | 278.19 | 91 | 110 | 25 | 7.15 | 1.5 |
| Amitriptyline-$d_3$ | 281.44 | 91 | 100 | 25 | 7.15 | 1.5 |
| Atrazine | 216.1 | 173.9 | 115 | 17 | 7.79 | 1.5 |
| Atrazine-$d_5$ | 222 | 179.7 | 115 | 20 | 7.74 | 1.5 |
| Benzoylecgonine | 290.14 | 168 | 115 | 17 | 3.87 | 1.5 |
| Benzoylecgonine-$d_3$ | 293.31 | 171 | 120 | 16 | 3.86 | 1.5 |
| Buspirone | 386.21 | 122 | 165 | 33 | 5.58 | 1.5 |
| Buspirone-$d_8$ | 394.21 | 121.9 | 185 | 36 | 5.56 | 1.5 |
| Clarithromycin | 748.51 | 158 | 165 | 29 | 7.50 | 3 |
| Haloperidol | 376.15 | 122.9 | 130 | 45 | 6.96 | 1.5 |
| Haloperidol-$d_4$ | 380.9 | 126.9 | 120 | 45 | 6.94 | 1.5 |
| Hydroquinidine | 327.21 | 55.1 | 150 | 45 | 5.59 | 1.5 |
| Imidacloprid | 256.06 | 209 | 95 | 9 | 4.83 | 1.5 |
| Imidacloprid-$d_4$ | 260.7 | 131.4 | 100 | 33 | 5.32 | 1.5 |
| Imipramine | 281.2 | 86.1 | 105 | 13 | 6.93 | 1.5 |
| Imipramine-$d_3$ | 284.2 | 193 | 100 | 40 | 6.93 | 1.5 |
| Imiquimod | 241.1 | 168.1 | 150 | 40 | 6.40 | 1.5 |
| Loratadine | 383.11 | 337 | 150 | 21 | 10.92 | 1.5 |
| Loratadine-$d_5$ | 388 | 337 | 150 | 25 | 10.95 | 1.5 |
| MCPP-$d_8$ | 206 | 159 | 135 | 20 | 4.47 | 1.5 |
| Mesoridazine | 387.2 | 98.1 | 150 | 40 | 6.16 | 1.5 |
| Methapyrilene | 262.1 | 97 | 150 | 40 | 5.30 | 1.5 |
| Methapyrilene-dimethyl-$d_6$ | 268 | 97 | 150 | 20 | 5.28 | 1.5 |
| Mianserin | 265.2 | 58.2 | 128 | 24 | 6.33 | 1.5 |
| Mianserin-$d_3$ | 268.4 | 61.2 | 130 | 25 | 6.31 | 1.5 |
| Mirtazapine | 266.2 | 72.2 | 128 | 16 | 4.98 | 1.5 |
| N-desmethyl-mirtazapine | 252.34 | 195 | 115 | 21 | 4.90 | 1.5 |
| Nefazodone | 470.2 | 246.1 | 150 | 20 | 7.91 | 1.5 |
| Nevirapine | 267.1 | 80 | 150 | 40 | 5.57 | 1.5 |
| Nizatidine | 332.1 | 58.1 | 150 | 40 | 1.50 | 1.5 |
| Quinine | 325.42 | 79 | 145 | 45 | 5.28 | 1.5 |

TABLE 37

Compound Parameters for negative mode analysis of
the 20-analyte mix (used for FIG. 15 and 16 data).

| Analyte | Precursor (m/z) | Product (m/z) | Fragmentor (V) | Collision Energy (V) | Retention Time (min) |
|---|---|---|---|---|---|
| Losartan | 421 | 127 | 150 | 40 | 7.89 |

The absolute recoveries of the analytes using silica coated with experimental HLB-65 is shown in FIG. 15. Silica coated with this HLB copolymer extracted a variety of analytes from spiked serum samples using a traditional 5-step SPE procedure.

Evaluation of Conventional HLB B and experimental HLB material HLB-79 (data shown in FIG. 16). Table 38 displays the SPE procedure. The previously described LC-MS/MS method was used.

TABLE 38

SPE procedure used for evaluation of polymer
coated silica (used for FIG. 16 data).

SPE Procedure
Load 1 mL sample (diluted 1:1 with 2% phosphoric acid for Conventional HLB B; 0.4% formic acid for experimental HLB-79) onto a dry bed (60 mg bed weight).
Wash cartridge with 1 mL of 5% MeOH (aq.)
Elute with 1 mL of MeOH (for Conventional HLB B); 50:50 MeOH:ACN (for HLB-79)
Evaporate samples to dryness at 40° C. with 10 psi nitrogen stream.
Reconstitute in 1 mL of starting mobile phase.

As shown in FIG. 16, experimental HLB-79 showed a more consistent recovery for the 20-analyte mixture than vinylpyrrolidone-containing Conventional HLB B when a simplified 3-step protocol was utilized to extract analytes from spiked serum. This 20-analyte set of compounds represents a log P range of −0.3-6.1. Due to the increased polarity of acrylonitrile and the ability to incorporate within divinyl benzene, improved recoveries were obtained, particularly for analytes with lower log P values.

The HLB copolymers provided herein have been shown to be useful in a variety of SPE applications. Using the methods described herein, the improved HLB adsorbents are capable of consistently extracting at least 18/20 analytes with recoveries >70% when using either 5-step or 3-step methods. Advantageously, the improved HLB adsorbents provided herein are well-suited to a 3-step protocol, where conditioning and equilibration steps were not required. The improved HLB material was also found to remove >98% of phospholipids present within a serum sample, on average.

The invention claimed is:

1. A polymeric adsorbent for solid phase extraction (SPE) comprising a copolymer formed by copolymerizing at least one hydrophobic monomer and at least one hydrophilic monomer,
wherein the hydrophobic monomer comprises divinylbenzene and the hydrophilic monomer comprises acrylonitrile
wherein the copolymerization is carried out in the presence of a nonpolar porogen and a polar porogen.

2. The polymeric adsorbent of claim 1 wherein the nonpolar porogen is selected from the group consisting of toluene, xylenes, benzene, hexane, cyclohexane, pentane, heptane, octane, nonane, decane, dodecane, isooctane, dichloromethane, chloroform, carbon tetrachloride, and combinations thereof.

3. The polymeric adsorbent of claim 1 wherein the polar porogen is selected from the group consisting of benzyl alcohol, butanol, pentanol, hexanol, heptanol, 4-methyl-2-pentanol, isoamyl alcohol, dodecanol, ethyl acetate, 2-ethylhexanol, cyclohexanol, and combinations thereof.

4. The polymeric adsorbent of claim 1 wherein the nonpolar porogen comprises o-xylene and the polar porogen comprises 4-methyl-2-pentanol.

5. The polymeric adsorbent of claim 1 wherein the ratio of hydrophobic monomer to hydrophilic monomer is in the range from 10:90 (wt. %) to 90:10 (wt. %).

6. The polymeric adsorbent of claim 5 wherein the ratio of hydrophobic monomer to hydrophilic monomer is in the range from 30:70 (wt. %) to 70:30 (wt. %).

7. The polymeric adsorbent of claim 6 wherein the ratio of hydrophobic monomer to hydrophilic monomer is about 63:37 (wt. %).

8. The polymeric adsorbent of claim 1 wherein the copolymer is poly(divinylbenzene-co-acrylonitrile).

9. The polymeric adsorbent of claim 8 wherein the ratio of divinylbenzene to acrylonitrile is in the range from about 90:10 (wt. %) to about 10:90 (wt. %).

10. The polymeric adsorbent of claim 9 wherein the ratio of divinylbenzene to acrylonitrile is in the range from about 25:75 (wt. %) to about 75:25 (wt. %).

11. The polymeric adsorbent of claim 10 wherein the ratio of divinylbenzene to acrylonitrile is about 63:37 (wt. %).

12. A porous spherical particle comprising the polymeric adsorbent of claim 1.

13. The porous spherical particle of claim 12 wherein the porous spherical particle has a diameter in the range from about 20 μm to about 125 μm.

14. The porous spherical particle of claim 13 wherein the porous spherical particle has a diameter in the range from about 30 μm to about 85 μm.

15. The porous spherical particle of claim 12 wherein the porous spherical particle has a diameter in the range from about 0.2 μm to about 5 μm.

16. The porous spherical particle of claim 15 wherein the porous spherical particle has a diameter in the range from about 0.8 μm to about 2 μm.

17. The porous spherical particle of claim 12 wherein the porous spherical particle has a surface area in the range from about 100 m2/g to 1000 m2/g.

18. The porous spherical particle of claim 17 wherein the porous spherical particle has a surface area in the range from about 350 m2/g to about 675 m2/g.

19. The porous spherical particle of claim 12 wherein the porous spherical particle has an average pore diameter in the range from about 50 Å to about 105 Å.

20. The polymeric adsorbent of claim 1 wherein the polymeric adsorbent is coated on a substrate.

21. The polymeric adsorbent of claim 20 wherein the substrate is selected from the group consisting of carbon, silica, and metal.

22. The polymeric adsorbent of claim 21 wherein the substrate is particulate.

23. The polymeric adsorbent of claim 21 wherein the substrate is a fiber.

24. A fiber comprising the polymeric adsorbent of claim 1.

25. The fiber of claim 24 wherein the polymeric adsorbent is coated directly onto the fiber.

26. The fiber of claim 24 wherein the polymeric adsorbent is porous.

27. The fiber of claim 24 wherein the polymeric adsorbent is nonporous.

28. The fiber of claim 24 wherein the polymeric adsorbent is a spherical particle.

29. The fiber of claim 28 further comprising an adhesive, wherein the adhesive is selected from the group consisting of epoxy resins, polydimethylsiloxane, polysilazane, acrylic resins, phenol formaldehyde resins, polyvinyl acetate, yellow carpenter's glue, polyvinylpyrrolidone, polyester resin, resorcinol resin, urea-resin glue, and combinations thereof.

30. The fiber of claim 28 further comprising a binder, wherein the binder is selected from the group consisting of polyacrylonitrile, polytetrafluoroethylene, gelatin, cellulose, cellulose derivatives, polyvinylpyrrolidone, starch, sucrose, polyethylene glycol, and combinations thereof.

31. A cartridge comprising a polymeric adsorbent of claim 1.

32. The cartridge of claim 31 wherein the polymeric adsorbent comprises porous spherical particles.

33. A method for removing one or more solutes from a solution, comprising the step of contacting the solution with a polymeric adsorbent of claim 1, wherein the solute is adsorbed onto the polymer.

34. The method of claim 33 wherein the solution comprises a polar solvent.

35. The method of claim 34 wherein the polar solvent is an aqueous solvent.

36. The method of claim 35 wherein the aqueous solvent has a pH in the range from 1 to 14.

37. The method of claim 36 wherein the aqueous solvent has a pH less than 7.

38. The method of claim 34 wherein the polar solvent is an organic solvent.

39. The method of claim 33 wherein the solution has more than 10 solutes.

40. The method of claim 33 wherein the solutes include at least one protein.

41. The method of claim 33 wherein the solutes include at least one pharmaceutically relevant analyte.

42. The method of claim 33 wherein the solutes include at least one phospholipid.

43. The method of claim 33 wherein the solutes include at least one protein and at least one phospholipid.

44. The method of claim 33 wherein at least about 75% of the solutes are removed from the solution with a recovery of at least 50%.

45. The method of claim 44 wherein at least about 90% of the solutes are removed from the solution with a recovery of at least about 70%.

46. A method for selective removal of a plurality of solutes from a sample comprising the step of
providing a polymeric adsorbent of claim 1;
contacting the sample with the polymeric adsorbent; wherein the solutes are adsorbed by the polymeric solvent; then
washing the polymeric adsorbent;
wherein some solutes remain adsorbed to the polymeric adsorbent after the wash step and some solutes are removed from the polymeric adsorbent during the wash step;
wherein the solutes are selected from the group consisting of proteins, phospholipids, inorganic salts, combinations thereof, and any other unwanted components.

47. The method of claim 46 wherein at least 90% of the solutes are adsorbed to the polymeric adsorbent in the contacting step.

48. A polymeric adsorbent for solid phase extraction (SPE) comprising a poly(divinylbenzene-co-acrylonitrile) copolymer having a porous structure including micropores and mesopores,
wherein the polymeric adsorbent is formed by copolymerizing divinylbenzene and acrylonitrile in the presence of a nonpolar porogen and a polar porogen.

49. The polymeric adsorbent of claim 48 wherein the nonpolar porogen comprises o-xylene and the polar porogen comprises 4-methyl-2-pentanol.

\* \* \* \* \*